United States Patent
Schuster et al.

(10) Patent No.: US 6,577,622 B1
(45) Date of Patent: Jun. 10, 2003

(54) SYSTEM AND METHOD FOR USING A PORTABLE INFORMATION DEVICE TO ESTABLISH A CONFERENCE CALL ON A TELEPHONY NETWORK

(75) Inventors: Guido M. Schuster, Des Plaines, IL (US); Sagan S. Sidhu, Vernon Hills, IL (US); Ikhlaq S. Sidhu, Vernon Hills, IL (US); Ronnen Belkind, Chicago, IL (US)

(73) Assignee: 3Com Corp., Santa Clara, CA (US)

( * ) Notice: Subject to any disclaimer, the term of this patent is extended or adjusted under 35 U.S.C. 154(b) by 0 days.

(21) Appl. No.: 09/406,128

(22) Filed: Sep. 27, 1999

(51) Int. Cl.[7] .......................... H04L 12/16; H04L 12/28
(52) U.S. Cl. ...................................... 370/352; 370/352
(58) Field of Search ................................ 370/260, 261, 370/262, 263, 352, 353, 354, 355, 356, 357, 358

(56) References Cited

U.S. PATENT DOCUMENTS

| 5,428,663 A | 6/1995 | Grimes et al. | |
|---|---|---|---|
| 5,448,623 A | 9/1995 | Wiedeman et al. | |
| 5,557,658 A | 9/1996 | Gregorek et al. | 379/67 |

(List continued on next page.)

FOREIGN PATENT DOCUMENTS

| DE | 198 13 179 A 1 | 9/1999 |
|---|---|---|
| EP | 0 578 374 A1 | 6/1993 |
| EP | 0 704 788 A2 | 4/1996 |
| EP | 0 869 688 A2 | 10/1998 |
| EP | 0 881 848 A2 | 12/1998 |
| WO | WO95/34985 | 12/1995 |
| WO | WO 97/31492 | 8/1997 |
| WO | WO 97/33421 | 9/1997 |
| WO | WO 98/00988 | 1/1998 |
| WO | WO 98/04065 | 1/1998 |
| WO | WO 98/10528 | 3/1998 |
| WO | WO 98/16051 | 4/1998 |
| WO | WO98/21911 | 5/1998 |
| WO | WO 98/30008 | 7/1998 |
| WO | WO 98/37665 | 8/1998 |
| WO | WO 99/12365 | 3/1999 |
| WO | WO 99/19988 | 4/1999 |

OTHER PUBLICATIONS

International Search Report for PCT Application Ser. No. PCT/US00/26618, Dated Feb. 19, 2001.

Pepper, David J. et al., *The Call Manager System: A Platform for Intelligent Telecommunications Services*, Speech Communication, vol. 23, (1997), pp. 129–139.

Dalgic, Ismail et al., *True Number Portability and Advanced Call Screening in a SIP–Based IP Telephony System*, IEEE Communications Magazine, vol. 37, No. 7, (Jul. 1999), pp. 96–101.

International Search Report for PCT Application Ser. No. PCT/US00/26094, Dated Jan. 31, 2001.

(List continued on next page.)

*Primary Examiner*—Wellington Chin
*Assistant Examiner*—Brenda Pham
(74) *Attorney, Agent, or Firm*—McDonnell Boehnen Hulbert & Berghoff

(57) ABSTRACT

A system and method for using a portable information device, such as a personal digital assistant, to establish a conference call on a telephony network. In one embodiment, a user of the portable information device may select communication partners from an address book application located in the portable information device. Communication information related to the communication partners is transmitted across a link from the portable information device to a voice communication device, such as a data network telephone. The data network telephone may then set up the conference call.

39 Claims, 14 Drawing Sheets

U.S. PATENT DOCUMENTS

| | | | | |
|---|---|---|---|---|
| 5,646,945 A | * | 7/1997 | Bergler | 370/419 |
| 5,727,057 A | | 3/1998 | Emery et al. | 379/211 |
| 5,742,905 A | | 4/1998 | Pepe et al. | 455/461 |
| 5,838,665 A | | 11/1998 | Kahn et al. | 370/260 |
| 5,850,433 A | | 12/1998 | Rondeau | 379/201 |
| 5,894,473 A | | 4/1999 | Dent | |
| 5,894,595 A | | 4/1999 | Foladare et al. | 455/414 |
| 5,918,172 A | | 6/1999 | Saunders et al. | 455/404 |
| 5,960,340 A | | 9/1999 | Fuentes | |
| 6,020,916 A | | 2/2000 | Gerszberg et al. | |
| 6,044,403 A | | 3/2000 | Gerszberg et al. | |
| 6,075,992 A | | 6/2000 | Moon et al. | |
| 6,266,539 B1 | | 7/2001 | Pardo | |
| 6,411,965 B2 | * | 6/2002 | Klug | 707/201 |

OTHER PUBLICATIONS

International Search Report for PCT Application Ser. No. PCT/US00/26594, Dated Feb. 6, 2001.

Watanabe, H., et al., *Development of the BTRON–BrainPad*, Proceedings 13$^{th}$ Tron Project International Symposium, Online!, (Dec. 4–7, 1996), pp. 95–103.

Gessler, Stefan et al., *PDAs as Mobile WWW Browsers*, Computer Networks and ISDN Systems, vol. 28, No. 1, (Dec. 1995), pp. 53–59.

International Search Report for PCT Application Ser. No. PCT/US00/26650, Dated Feb. 19, 2001.

International Search Report for PCT Application Ser. No. PCT/US00/41020, Dated. Feb. 21, 2001.

Anquetil, L.P. et al., *Media Gateway Control Protocol and Voice Over IP Gateways. MGCP and VoIP Gateways Will Offer Seamless Interworking of New VoIP Networks with Today's Telephone Networks*, Electrical Communication, (Apr. 1, 1999), pp. 151–157.

International Search Report for PCT Application Ser. No. PCT/US00/26649, Dated Feb. 6, 2001.

Zellweger, Polle T. et al. *An Overview of the Etherphone System and Its Applications*, Xerox Palo Alto Research Center (Mar. 1988), pp. 160–168, XP 000617541.

Terry, Douglas B. et al. *Managing Stored Voice in the Etherphone System*, Xerox Palo Alto Research Center vol. 1, (Feb. 1998), pp. 3–27, XP 000032477.

Terry, Douglas B. et al. *Managing Stored Voice in the Etherphone System*, Operating Systems Review (SIGOPS), US, ACM Head Quarter, New York, NY. vol. 21, No. % (Nov. 8, 1987), pp. 103–104, XP 000005196.

Hansson, Allan et al., *Phone Doubler—A Step Towards Integrated Internet and Telephone Communities*, Ericsson Review, No. 4, 1997, pp. 142–152.

U.S. patent application Ser. No. 09/406,151, Guido M. Schuster et al., filed Sep. 27, 1999.

* cited by examiner

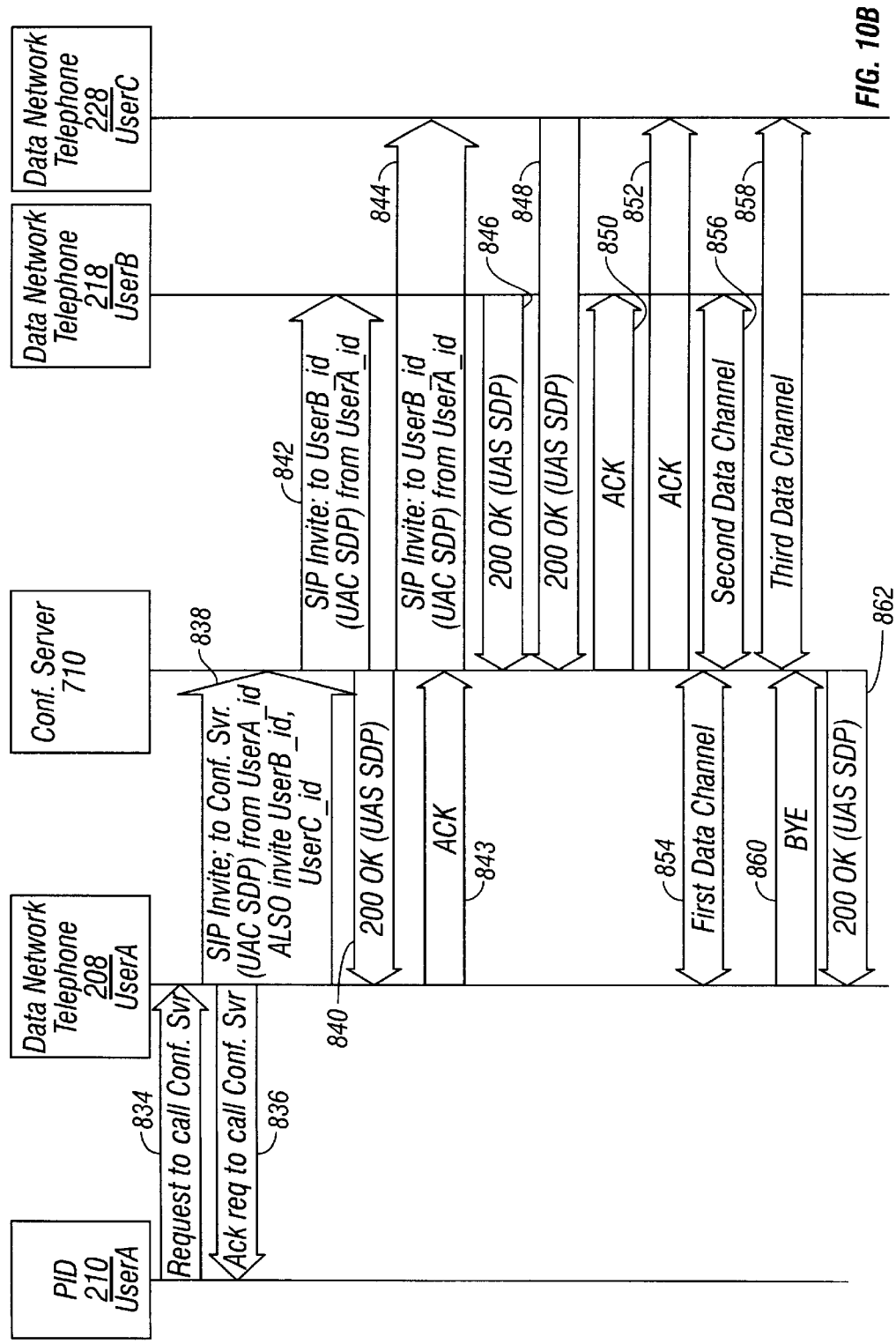

SYSTEM AND METHOD FOR USING A PORTABLE INFORMATION DEVICE TO ESTABLISH A CONFERENCE CALL ON A TELEPHONY NETWORK

BACKGROUND OF THE INVENTION

1. Field of the Invention

The present invention is related to a method and system for providing communication services over a network. In particular, the present invention relates to a system and method for establishing a conference call on a telephony network.

2. Description of the Related Art

For many years, telephone service providers on the Public Switched Telephone Network (PSTN) provided their customers nothing more than a telephone line to use to communicate with other subscribers. Over time, telephone service providers have enhanced their service by providing Custom Local Area Signaling Service (CLASS) features to their customers. Similar communication services are provided by a Private Branch Exchange (PBX), which is typically implemented in a nonresidential setting.

The CLASS features permit customer subscribers of the features to tailor their telephone service according to individual needs. Some of the more popular CLASS features are:

Call blocking: The customer may specify one or more numbers from which he or she does not want to receive calls. A blocked caller will hear a rejection message, while the callee will not receive any indication of the call.

Call return: Returns a call to the most recent caller. If the most recent caller is busy, the returned call may be queued until it can be completed.

Call trace: Allows a customer to trigger a trace of the number of the most recent caller.

Caller ID: The caller's number is automatically displayed during the silence period after the first ring. This feature requires the customer's line to be equipped with a device to read and display the out-of-band signal containing the number.

Caller ID blocking: Allows a caller to block the display of their number in a callee's caller ID device.

Priority ringing: Allows a customer to specify a list of numbers for which, when the customer is called by one of the numbers, the customer will hear a distinctive ring.

Call forwarding: A customer may cause incoming calls to be automatically forwarded to another number for a period of time.

A customer subscriber to a CLASS feature may typically activate and/or deactivate a CLASS feature using "*" directives (e.g., *69 to automatically return a call to the most recent caller). CLASS features may also be implemented with the use of out-of-band data. CLASS feature data is typically transmitted between local Class-5 switches using the Signaling System #7 (SS7).

Local Exchange Carriers (LECs) and other similar organizations maintain CLASS offices that typically contain a database entry for each customer. The database allows specification of the CLASS features a customer has subscribed to, as well as information, such as lists of phone numbers, associated with those features. In some cases, customers may edit these lists on-line via a touch-tone interface. A list of all phone numbers that have originated or terminated a call with each customer is often included in the CLASS office database. For each customer, usually only the most recent number on this list is stored by the local Class-5 switch.

A Private Branch Exchange (PBX), is a stored program switch similar to a Class-5 switch. It is usually used within a medium-to-large-sized business for employee telephony service. Since a PBX is typically operated by a single private organization, there exists a wide variety of PBX services and features. Custom configurations are common, such as integration with intercom and voice mail systems. PBX's typically support their own versions of the CLASS features, as well as other features in addition to those of CLASS. Most PBX features are designed to facilitate business and group communications.

A summary of typical PBX features includes:

Call transfer: An established call may be transferred from one number to another number on the same PBX.

Call forwarding: In addition to CLASS call forwarding, a PBX number can be programmed to automatically transfer a call to another number when the first number does not answer or is busy.

Camp-on queuing: Similar to PSTN call return, a call to a busy number can be queued until the callee can accept it. The caller can hang up their phone and the PBX will ring them when the callee answers.

Conference calling: Two or more parties can be connected to one another by dialing into a conference bridge number.

Call parking: An established call at one number can be put on hold and then reestablished from another number. This is useful when call transfer is not warranted.

Executive override: A privileged individual can break into an established call. After a warning tone to the two participants, the call becomes a three-way call.

While the CLASS and PBX features have enhanced the offerings of service providers that use the PSTN, the features are nevertheless limited in their flexibility and scope. The effect to the user is that the features become clumsy and difficult to use. For example, in order to use the Call Forwarding function, the user must perform the steps at the user's own phone prior to moving to the location of the telephone to which calls will be forwarded. A more desirable approach, from the standpoint of usefulness to the user, would be to perform the steps at the telephone to which calls will be forwarded.

Much of the lack of flexibility of the PSTN features is due to the lack of flexibility in the PSTN system itself. One problem with the PSTN is that the terminal devices (e.g. telephones) lack intelligence and operate as "dumb" terminals on a network having the intelligence in central offices. Most PSTN telephones are limited in functional capability to converting the analog signals they receive to sound and converting the sound from the handset to analog signals.

Some PSTN telephones have a display device and a display function to display specific information communicated from intelligent agents in the PSTN network using the PSTN signaling architecture. For example, some PSTN telephones have a display function to enable the Caller ID feature. Even such PSTN telephones are limited however by the closed PSTN signaling architecture, which prohibits access by the PSTN telephones to the network signaling protocols. The display functions are effectively limited to displaying text, again, as a "dumb" terminal.

The Internet presents a possible solution for distributing intelligence to telephony terminal devices. In Internet telephony, digitized voice is treated as data and transmitted across a digital data network between a telephone calls' participants. One form of Internet telephony uses a telephony gateway/terminal where IP telephony calls are terminated on the network. PSTN telephones are connected by a subscriber line to the gateway/terminal at the local exchange, or at the nearest central office. This form of Internet telephony provides substantial cost savings for users. Because the PSTN portion used in Internet telephony calls is limited to the local lines on each end of the call, long distance calls may be made for essentially the cost of a local call. Notwithstanding the costs savings provided by this form of Internet telephony, it is no more flexible than the PSTN with respect to providing enhancements and features to the basic telephone service.

In another form of Internet telephony, telephones are connected to access networks that access the Internet using a router. The telephones in this form of Internet telephony may be substantially more intelligent than typical PSTN telephones. For example, such a telephone may include substantially the computer resources of a typical personal computer.

Data network telephones and the data network (e.g. Internet) system in which they operate, however, lack a substantial infrastructure and service providers for providing telephone service.

It would be desirable to incorporate CLASS and PBX features into a data network telephony system that uses a data network such as the Internet.

It would be desirable to provide new features and enhancements to telephony service that accommodates and conforms to users' needs.

It would also be desirable to provide features and capabilities to telephone service that create new opportunities for users and for service providers.

The present invention addresses the above needs by providing a system in a data network telephony system, such as for example, the Internet, that enables a PID (Portable Information Device) user to establish a conference call on a telephony network.

BRIEF DESCRIPTION OF THE DRAWINGS

Presently preferred embodiments of the invention are described below in conjunction with the appended drawing figures, wherein like reference numerals refer to like elements in the various figures, and wherein:

FIG. 10B is a message flow diagram showing an exemplary flow of messages in a system for establishing a conference call on a telephony network, according to a third embodiment of the present invention;

DETAILED DESCRIPTION OF THE PREFERRED EMBODIMENT

The following references to patent applications filed concurrently herewith are incorporated by reference:

"System and Method for Controlling Telephone Service Using a Wireless Personal Information Device" to Schuster, et al., Ser. No. 09/406,321

"System and Method for Advertising Using Data Network Telephone Connections" to Schuster, et al. Ser. No. 09/406,320

"System and Method for Providing User-Configured Telephone Service in a Data Network Telephony System" to Sidhu, et al., Ser. No. 09/405,283

"System and Method for Accessing a Network Server Using a Portable Information Device Through a Network Based Telecommunication System" to Schuster, et al., Ser. No. 09/406,322

"System and Method for Interconnecting Portable Information Devices Through a Network Based Telecommunication System" to Schuster, et al., Ser. No. 09/406,152

"System and Method for Enabling Encryption on a Telephony Network" to Schuster, et al., Ser. No. 09/405,981

"System and Method for Associating Notes with a Portable Information Device on a Network Telephony Call" to Schuster, et al., Ser. No. 09/406,151

"System and Method for Providing Shared Workspace Services Over a Telephony Network" to Schuster, et al., Ser. No. 09/406,298

"System and Method for Providing Service Provider Configurations for Telephones in a Data Network Telephony Systme"to Schuster, et al., Ser. No. 09/406,066

The following additional references are also incorporated by reference herein:

"Multiple ISP Support for Data Over Cable Networks" to Ali Akgun, et al., Ser. No. 09/321,941

"Method and System for Provisioning Network Addresses in a Data-Over-Cable System" to Ali Akgun, et al., Ser. No. 09/218,793.

"Network Access Methods, Including Direct Wireless to Internet Access" to Yingchun Xu, et al., Ser. No. 08/887,313

A. PID-Enabled Data Network Telephony System

Figure 1:
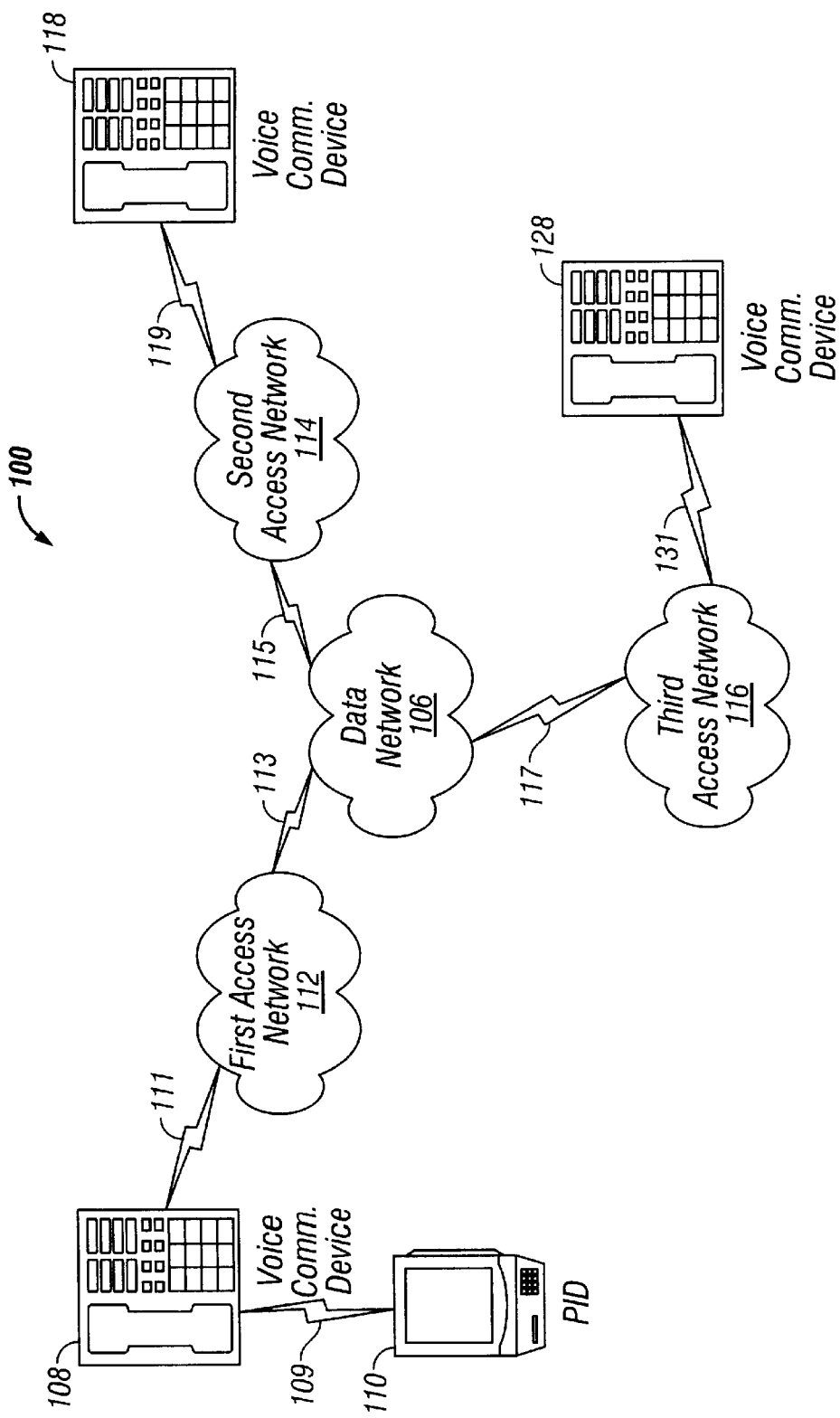
FIG. 1 is block diagram of a network telephony system according to one embodiment of the present invention.

FIG. 1 is a block diagram showing an exemplary embodiment of a system 100 for establishing a conference call on a telephony network according to the present invention. The system includes a data network 106. A first voice communication device 108 linked to a first access network 112 via connection 111 may communicate over the data network 106 by connecting via the first access network 112. A second voice communication device 118 is linked to a second access network 114 through connection 119 and may communicate over the data network 106 by connecting via the second access network 114. A third voice communication device 128 is linked to a third access network 116 through connection 131 and may communicate over the data network 106 by connecting via the third access network 116.

The data network 106 in the system 100 typically includes one or more Local Area Networks (LANs) connected to one another or to a Wide-Area Network (WAN), such as an Internet Protocol (IP) network, to provide wide-scale data connectivity. The data network 106 may use Voice-Over-Packet (VOP) schemes in which voice signals are carried in data packets. The network 106 may also include a connection to the Public Switched Telephone Network (PSTN) to allow for voice connections using traditional circuit switching techniques. In one embodiment, the data network 106 may include one or more LANs such as Ethernet LANs and support data transport protocols for performing Voice-over-Internet-Protocol (VoIP) techniques on the Internet. For further details regarding VoIP, see the information available through the Internet Engineering Task Force (IETF) at www.ietf.org. In addition, an Internet Telephony gateway may be included within the system 100 to allow for voice connections to users connected by subscriber lines at a PSTN Central Office. Other data besides voice may also be communicated over the data network 106.

The voice communication devices 108, 118, and 128 typically include a voice input, a voice output, and a voice processing system (described further below with reference to FIG. 3). The voice processing system converts voice sound to digital data signals that are communicated on a voice connection over the data network. The voice processing system also converts digital data signals received from the voice connection to voice sound. The voice communication devices 108, 118, and 128 typically include a central processing unit and memory to store and process computer programs.

Additionally, each voice communication device typically includes a unique network address, such as an IP address, in memory to uniquely identify it to the data network 106 and to permit data packets to be routed to the device.

A PID 110 linked to the first voice communication device 108 via link 109 may communicate over the data network 106 by connecting via the first access network 112. The PID 110 includes user attributes stored in a user information data base. The user attributes may contain such information as a user identifier, schedule information, information about contacts, and other information that is associated with a user of the PID 110. The PID 110 includes a user interface allowing a user to easily enter and retrieve data. In a preferred embodiment, the user interface includes a pressure-sensitive display that allows a user to enter input with a stylus or other device. An example of a PID with such an interace is a PDA (Personal Digital Assistant), such as one of the Palm™ series of PDAs offered by 3Com® Corporation. The PID 110 may include other functionality, such as wireless phone or two-way radio functionality.

Link 109 is a point-to-point link, and may be entirely or partially wireless, or may be a hard-wired connection. Preferably, the link 109 is a wireless link, such as an infrared link specified by the Infrared Data Association (IrDA) (see www.irda.org for further information) or a radio frequency (RF) link such as the Bluetooth system (see www.bluetooth.com for further information). However, the point-to-point link can also be a hardwired connection, such as an RS-232 serial port connection.

In one embodiment, the voice communication device 108 includes a handset with a receiver and transmitter similar or identical to handsets of traditional circuit-switched telephones. A console on which the handset sits may include the voice processing system, a display 116, and a keypad 118, for example.

In a preferred embodiment, a portion of the voice communication device 108 utilizes an NBX 100™ communication system phone offered by 3Com® Corporation. In alternative embodiments, the voice communication .device 108 may include any device having voice communications capabilities. For example, a personal computer having a microphone input and speaker output may also be used to implement the voice communication device 108. Other configurations are also intended to be within the scope of the present invention.

The details relating to operation of the voice communication devices 108, 118, and 128 depend on the nature of the data network 106 and the nature of the access networks 112, 114, and 116 connecting the voice communication devices 108, 118, and 128 to each other and/or to other network entities. The access networks 112, 114, and 116 typically include any high bandwidth network adapted for data communications, i.e. a network having greater than 64,000 bits-per-second (bps) bandwidth. The access networks 112, 114, and 116 may link to the voice communication devices 108, 118, and 128 using an Ethernet LAN, a token ring LAN, a coaxial cable link (e.g. CATV adapted for digital communication), a digital subscriber line (DSL), twisted pair cable, fiberoptic cable, an integrated services digital network (ISDN) link, and wireless links, for example. In embodiments that may not require bandwidth greater than 64,000 bps, the access networks 112, 114, and 116 may also include the PSTN and link the voice communications devices 108, 118, and 128 by an analog modem. Further details regarding specific implementations are described below, with reference to FIGS. 2 through 12.

B. System for Establishing a Conference Call on a Data Network Telephony System

One advantage of the PDA-Enabled Data Network Telephony System 100 in FIG. 1 is that it may be used to establish conference calls between users on the Data Network Telephony System. In one embodiment, the PID 110 allows a user to select the communications partners to be included in the conference call. The PID 110 then transfers information about the communications partners to first voice communication device 108 through the link 109. The first voice communication device 108 then sets up the conference call with voice communication devices associated with the communication partners selected by the user associated with the first voice communication device 108.

Once a conference call is set up, data can be transferred between the conferenced voice communication devices.

PIDs, such as the PID 110, associated with the parties to the conference call may also be used to communicate information. For example, the PID 110 linked to the first voice communication device 108 may be able to accept and display PID data entered by a user through a user interface on the PID 110. The PID data can then be communicated across the link 109 to the voice communication device 108 for transport across the first access network 112, the data network 106, and the second and third access networks 114 and 116 to the second and third voice communication devices 118 and 128. The PID 110 can also receive PID data and other data across the link 109 for display on the PID 110. A voice-over-data channel for communicating voice-over-data can concurrently exist with this communication of PID data over a PID data channel. Preferably, all parties to the conference call have PIDs linked to the voice communication devices associated with the parties. In this way, a user of the PID 110 can communicate PID data to other parties to the conference call while voice signals are communicated between the voice communication devices.

1. Local Area Networks as an Exemplary Access Networks

Figure 2:
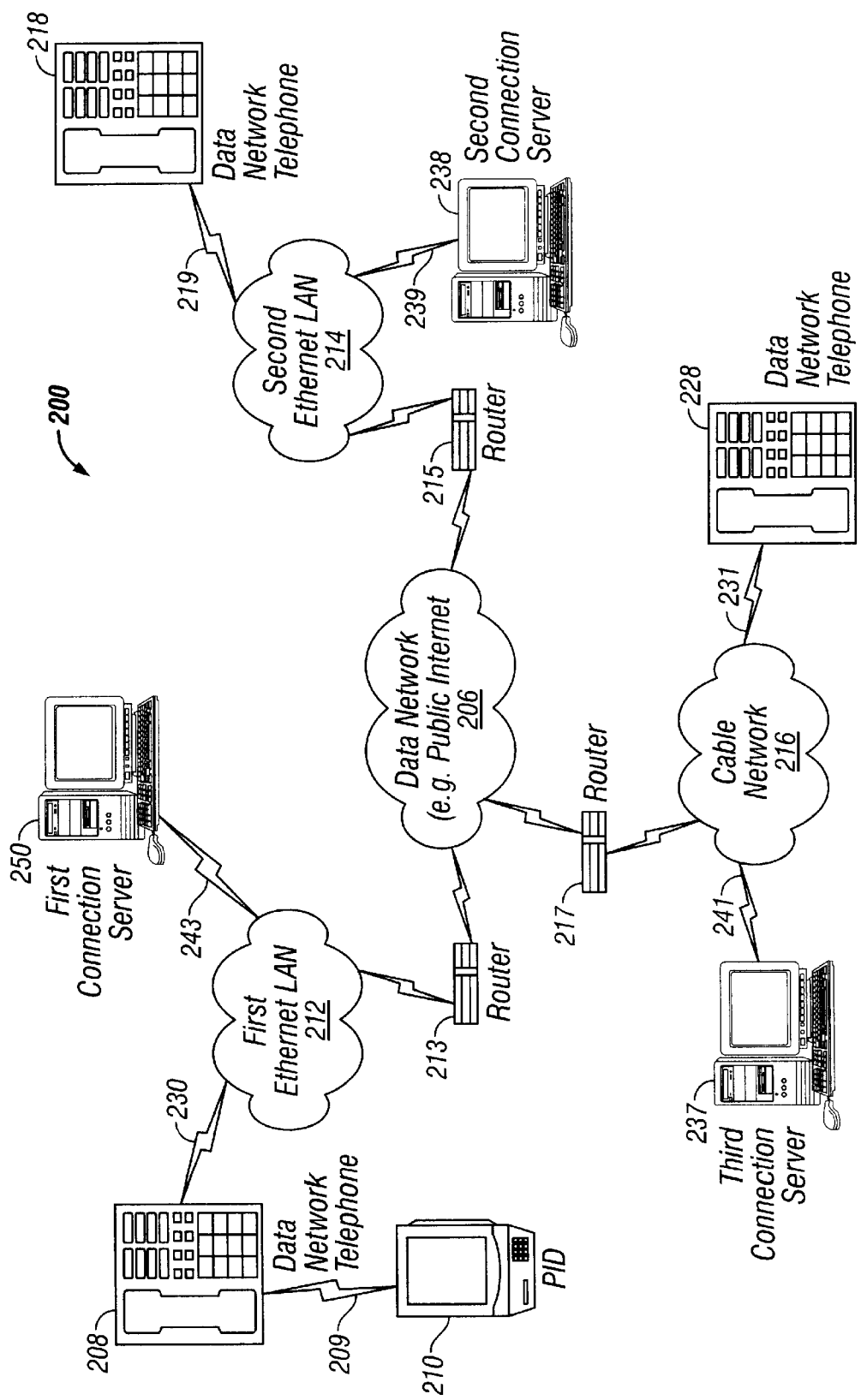
FIG. 2 is a block diagram showing a system for establishing a conference call on a telephony network according to an exemplary embodiment of the present invention.

FIG. 2 is a block diagram showing one example of the system 100 of FIG. 1 for establishing a conference call on a telephony network according to the present invention. The system 200 in FIG. 2 includes a local area network 212 connected to a data network 206 by a first router 213. A second local area network 214 is connected to the data network 206 by a second router 215. A cable network 216 is connected to the data network 206 by a third router 217. Those of ordinary skill in the art will appreciate that while FIG. 2 illustrates the access networks as two local area networks 212 and 214, and a cable network 216, any other type of network may be used. For example, the local area networks and the cable network may be replaced by ISDN, DSL, or any other high-speed data link.

The local area networks 212 and 214 provide data connectivity to their respective network elements. For example, the first LAN 212 provides data connectivity to at least a first data network telephone 208 and a first network telephony connection server 250. The second LAN 214 provides data connectivity to at least a second data network telephone 218 and a second network telephony connection server 238. The local area networks 212 and 214 in FIG. 2 are, for example, Ethernet LANs operating according to the IEEE 802.3 specification, which is incorporated by reference herein; however, other types of local area networks may also be used. The first local area network 212 uses the router 213 to provide the first data network telephone 208 and the first network telephony connection server 250 with access to the data network 206. For example, the router 213 may perform routing functions using protocol stacks that include the Internet Protocol and other protocols for communicating on the Internet. Similarly, the second local area network 214 uses the router 215 to provide the second data network telephone 218 and the second network telephony connection server 238 with access to the data network 206.

The first, second, and third network telephony connection servers 250, 238, and 237 provide telephony registration, location and session initiation services for voice connections in which at least one of their members are a party. For example, a user of the first data network telephone 208 may register for telephony service with an administrator of the first network telephony connection server 250 and receive a user identifier and a telephone identifier. The user identifier and telephone identifier may be sequences of unique alphanumeric elements that callers use to direct voice connections to the user. The network telephony connection servers 250, 238 and 237 register users by storing user records in registration databases (not shown in FIG. 2) associated with each of the network telephony connection servers 250, 238 and 237, in response to registration requests.

The call setup process and the user and telephone identifiers preferably conform to requirements defined in a call-management protocol. The call-management protocol is used to permit a caller anywhere on the data network to connect to the user identified by the user identifier in a data network telephone call. A data network telephone call includes a call setup process and a voice exchange process. The call setup process includes steps and message exchanges that a caller and callee perform to establish the telephone call. The actual exchange of voice signals is performed by a data communications channel. The data communications channel incorporates other data transport and data formatting protocols, and preferably includes well-known data communications channels typically established over the Internet.

The call management protocol used in FIG. 2 is the Session Initiation Protocol (SIP), which is described in M. Handley et al., "SIP: Session Initiation Protocol," IETF RFC 2543, March 1999, incorporated by reference herein; however, any other such protocol may be used. Other protocols include H.323, MEGACO, the Media Gateway Control Protocol (MGCP), etc.

The network telephony connection servers 250, 238, and 237 may be used to provide telephony service for mobile users. For example, a user may be registered to use the first network telephone 208 (which is identified by its telephone identifier), but the user may move to a location near a second network telephone (not shown) on the first local area network 212. The user may re-register as the user of the second telephone. Calls that identify the user by the user's user identifier may then reach the user at the second network telephone.

2. Cable Network as an Exemplary Access Network

The system 200 in FIG. 2 also shows a cable network 216 connected to the data network 206 by a router 217. The cable network 216 provides data network access to its network elements, which in FIG. 2 include a third data network telephone 228 and a third network telephony connection server 237. A user of the third data network telephone 218 connected to the cable network 216 may communicate by telephone over the data network 206 with the users of the first and second data network telephones 208 and 218 respectively connected to the first and second local area networks 212 and 214.

The cable network 216 includes any digital cable television system that provides data connectivity. In the cable network 216, data is communicated by radio frequency in a high-frequency coaxial cable. The cable network 216 may include a head-end, or a central termination system that permits management of the cable connections to the users.

3. Providing Telephony Services

The third network telephony connection server 237 is preferably a SIP-based server that performs call initiation, maintenance, and teardown for the third data network telephone 228 connected to the cable network 216. The third network telephony connection server 240 may be similar or identical to the first and second network telephony respectively connection servers 250 and 238 connected to the first and second local area networks 212 and 214.

The system 200 shown in FIG. 2 includes a data network telephony system that permits the first and second data network telephones 208 and 241 respectively connected to the local area networks 212 and 214 to communicate with the third data network telephone 228 connected to the cable network 216. The system shown in FIG. 2 uses SIP in order to establish, maintain, and teardown telephone calls between users.

There are two major architectural elements to SIP: the user agent (UA) and the network server. The UA resides at the SIP end stations, (e.g. the data network telephones), and contains two parts: a user agent client (UAC), which is responsible for issuing SIP requests, and a user agent server (UAS), which responds to such requests. There are three different network server types: a redirect server, a proxy server, and a registrar. The various network server types may be combined into a single server, such as the network telephony connection servers 250, 240, and 238. Not all server types are required to implement the embodiments of the present invention. The communication services to be provided will determine which servers are present in the communication system. Preferred embodiments of the present invention may be carried out using proxy servers.

One example of a SIP operation involves a SIP UAC issuing a request, a SIP proxy server acting as end-user location discovery agent, and a SIP UAS accepting the call. A successful SIP invitation consists of two requests: INVITE followed by ACK. The INVITE message contains a user identifier to identify the callee, a caller user identifier to identify the caller, and a session description that informs the called party what type of media the caller can accept and where it wishes the media data to be sent. User identifiers in SIP requests are known as SIP addresses. SIP addresses are referred to as SIP Uniform Resource Locators (SIP-URLs), which are of the form sip:user@host.domain. Other addressing conventions may also be used.

Redirect servers process an INVITE message by sending back the SIP-URL where the callee is reachable. Proxy servers perform application layer routing of the SIP requests and responses. A proxy server can either be stateful or stateless. A stateful proxy holds information about the call during the entire time the call is up, while a stateless proxy processes a message without saving information contained in the message. Furthermore, proxies can either be forking or non-forking. A forking proxy can, for example, ring several phones at once until somebody takes the call. Registrar servers are used to record the SIP address (called a SIP URL) and the associated IP address. The most common use of a registrar server is for the UAC to notify the registrar where a particular SIP URL can be reached for a specified amount of time. When an INVITE request arrives for the SIP URL used in a REGISTER message, the proxy or redirect server forwards the request correctly.

At the first local area network 212, the central registrar/proxy server, such as the first network telephony server 250, is the primary destination of all SIP messages trying to establish a connection with users on the first local area network 212. Preferably, the first network telephony server 250 is also the only destination advertised to the SIP clients outside the first local area network 212 on behalf of all the SIP clients residing on the first local area network 212. The network telephony server 250 relays all SIP INVITE messages to the appropriate final destination (or another SIP proxy), based on a database lookup using a first SIP database (not shown) associated with the first network telephony server 250. This allows all mobile clients to register with their current locations.

Similarly, the second network telephony server 238 is the primary destination of all SIP messages trying to establish a connection with the data network telephone 218 connected to the second local area network 214. Preferably, the second network telephony server 238 is also the only destination advertised to the SIP clients outside the second local area network 214 on behalf of all the SIP clients (e.g. data network telephones) residing on the second local area network 214. The second network telephony server 238 relays all SIP INVITE messages to the appropriate final destination (or another SIP proxy), based on a database lookup using a second SIP database. The third network telephony server 237 behaves similarly to the first and second network telephony servers 250 and 238.

The data network telephones 208, 218, and 228 in the system 200 preferably have pre-programmed device identifiers (e.g. phone numbers), represented as SIP-URL's that are of the form sip: user@domain. An example is sip: 8475551212@3Com.com. After power-up, each of the data network telephones 208, 218, and 228 sends a SIP REGISTER message to the default registrar, such as the network telephony servers 250, 238, and 237. When a call arrives at one of the network telephony servers 250, 238, or 237 for any of the registered SIP URLs, the server will forward the call to the appropriate destination. If a data network telephone is moved to a new location, all calls to the associated SIP URL will still be properly routed to that device. In other words, the system in FIG. 2 provides device mobility in the sense that calls will "follow" the data network telephone according to its SIP URL. This is especially useful if the data network telephone 208, 218, or 228 is running the DHCP (Dynamic Host Configuration Protocol) so that when the location is changed, the IP address is also automatically changed.

An advantage of the system in FIG. 2 is that once the call is established between data network telephones, the data network 206 provides data connectivity for a plurality of data communications channels. For example, the data network telephones 208, 218, and 228 can communicate voice signals as voice-over-data packets on a voice-over-data channel. The data network telephones 208, 218, and 228 may also be able to communicate PID data as PID data packets on a PID data channel. Other data types may also be communicated. For example, the PID data may be communicated to and from the PID 210 across link 209 to the data network telephone 208, where the PID data may be assembled into packets and disassembled from packets as part of the process for communicating the PID data packets across the data network 206 and any access networks, such as the first Ethernet LAN 212, the second Ethernet LAN 214, and the cable network 214. For example, the PID data may be communicated to and from at least one other PID (not shown) through a network device (such as a data network telephone) located in the system 200.

4. The Data Network Telephones

The data network telephones 208, 218, and 228 are preferably telephones that include an Ethernet communications interface for connection to an Ethernet port. The Ethernet phones in FIG. 2 support the Internet Protocol (IP), using an IP address that is either statically configured or obtained by access to a Dynamic Host Configuration Protocol (DHCP) server.

Figure 3:
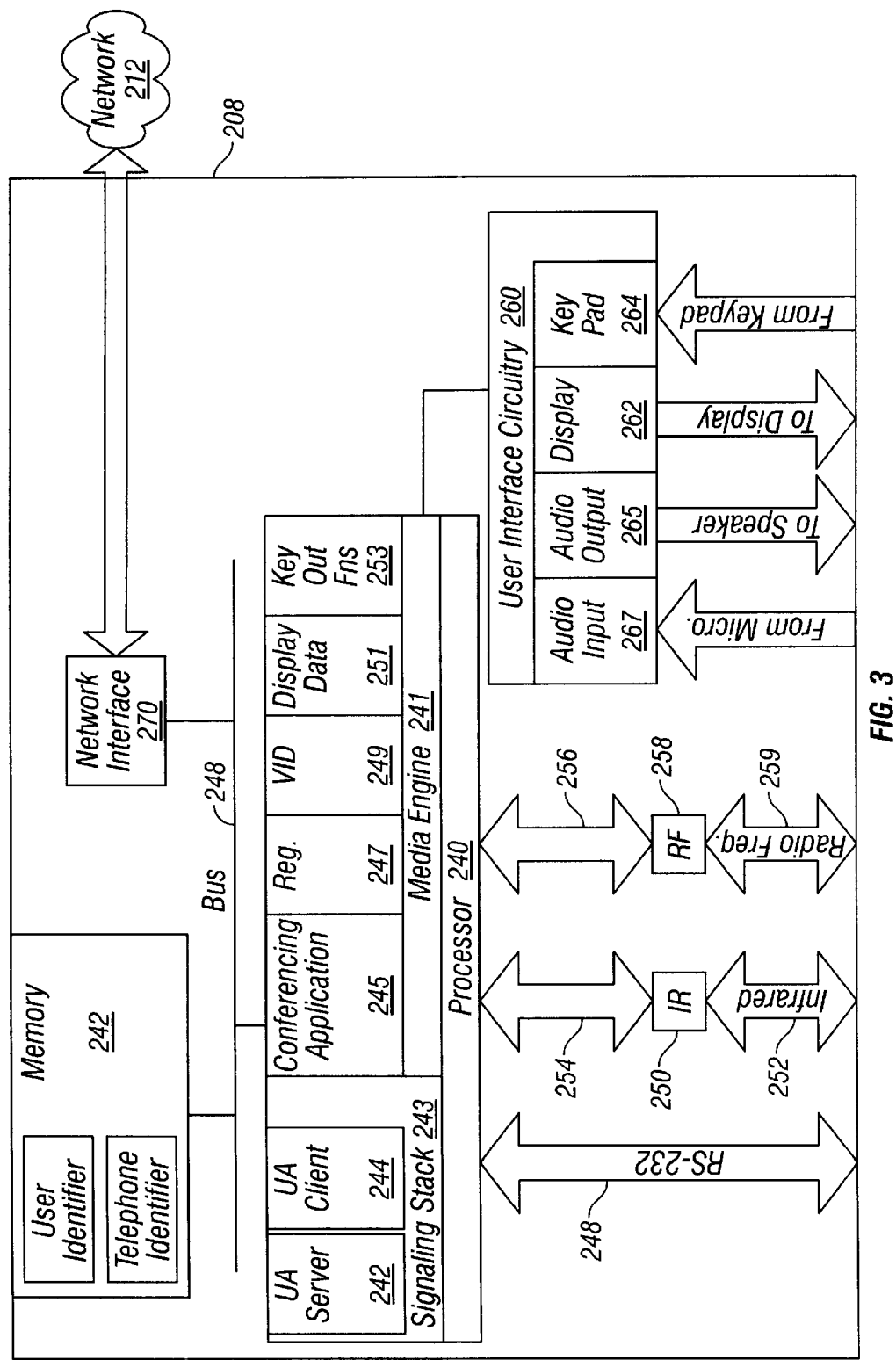
FIG. 3 is a block diagram of a data network telephone according to an exemplary embodiment of the present invention.

FIG. 3 is a block diagram showing the first data network telephone 208 connected to the local area network 212 in FIG. 2. The data network telephone 208 in FIG. 3 is connected to the network 212 by a network interface 270. The network interface 270 may, for example, be a network interface card, and may be in the form of an integrated circuit. A bus 248 may be used to connect the network interface 270 with a processor 240 and a memory 242. Also connected to the processor are user interface circuitry 260 and three alternative interfaces to a Personal Information Device (PID).

A first alternative interface 248 includes an RS-232 serial connection and associated coupling hardware and mechanisms. The first alternative interface 248 may, for example, be a docking cradle for a PID, such as a PDA (Personal Digital Assistant), in which information may be transferred between the PID and the first data network telephone 208. The second alternative interface comprises a first-connection 254, such as an RS-232 connection, along with infrared circuitry 250 for converting signals into infrared output and for accepting infrared input. An infrared interface 252 may also be included within the second alternative interface. The third alternative interface comprises a first connection 256, such as an RS-232 connection, along with radio-frequency circuitry 258 for converting signals into radio frequency output and for accepting radio frequency input. A radio frequency interface 259 may also be included as part of the third alternative interface.

The three alternative interfaces described above are merely examples, and additional means for implementing the interface between the data network telephone 208 and the PID may also be used. Although three interfaces are shown in FIG. 3, there may be only one such interface in the data network telephone 208. More than one interface may be included to improve flexibility and to provide redundancy in case of failure of an interface.

The user interface circuitry 260 includes hardware and software components that access the functions of the handset, display, and keypad to provide user input and output resources for functions in the processor 240. The user interface circuitry may include a display interface 262, a keypad interface 264, an audio output interface 265, and an audio input interface 267.

The audio input interface 267 may receive voice signals from a microphone or other audio input device and convert the signals to digital information. The conversion preferably conforms to the G.711 ITU Standard. Further processing of the digital signal may be performed in the audio input interface 267, such as to provide compression (e.g. using G.723.1 standard) or to provide noise reduction, although such processing may also be performed in the processor 240. Alternatively, the audio input interface 267 may communicate an analog voice signal to the processor 240 for conversion to digital information.

The audio output interface 265 receives digital information representing voice from the processor 240 and converts the information to sound. In one embodiment, the audio output interface 265 receives information in the form of G.711 although other processing such as decompression may be performed in the audio output interface 265. Alternatively, the processor 240 may convert digital information to analog voice signals and communicate the analog voice signals to the audio output interface 265.

The keypad interface 264 and the display interface 262 include well-known device interfaces and respective signal processing techniques. The user interface circuitry 260 may support other hardware and software interfaces. For example, a videophone implementation might also include a camera and monitor. The data network telephones of the present invention are not limited to telephones or videophones—additional user interface types, for example, such as the ones needed for computer games, are also contemplated as being within the scope of the present invention.

The processor 240 may consist of one or more smaller processing units, including, for example, a programmable digital signal processing engine. In the preferred embodiment, the processor is implemented as a single ASIC (Application Specific Integrated Circuit) to improve speed and to economize space. The processor 240 also may include an operating system, and application and communications software, firmware, or hardware, to implement the functions of the first data network telephone 208. For example, the processor may include a conferencing application 245 to assist in gathering communication partner data from a PID and to establish the conference call by connecting the conference call parties. The operating system may be any suitable commercially available embedded or disk-based operating system, or any proprietary operating system.

The processor 240 includes a media engine 241 and a signaling stack 243 to perform the primary communications and application functions of the data network telephone 208. The purpose of the signaling stack in an exemplary data network telephone 208 is to set up, manage, and tear down a call. During the setup phase, a user may use the keypad to enter a user identifier to call. The signaling stack 243 receives the user entry and formats a request message to send to the user identified by the user identifier to initiate a telephone call. When the request message is sent, the location of the user identified by the user identifier is discovered, communication parameters, such as the supported voice CODEC types are exchanged, and a voice over data channel is established. During the management phase, for example, other parties are invited to the call if needed. During the teardown phase, the call is terminated.

The signaling protocol used in the exemplary data network telephone 208 in FIG. 3 is the SIP protocol. In particular, the signaling stack implements a User Agent Client 244 and a User Agent Server 242, in accordance with the SIP protocol. Alternative signaling protocols, such as the ITU-T H.323 protocol and others, may also be used to implement the present invention.

Once the call is set up, the media engine 241 manages the communication over a data communications channel using a network transport protocol and the network interface 270. The media engine 241 sends and receives data packets having a data payload for carrying data and an indication of the type of data being transported. The media engine 241 in the data network telephone 208 may sample the voice signals from the audio input 267 (or receive voice samples from the audio input 267), encode the samples, and build data packets on the sending side. On the receiver side, in addition to performing the reverse operations, the media engine also typically manages a receiver buffer to compensate for network jitter.

The media engine 241 includes hardware and software components for enabling conferencing 245, performing registration functions 247, voice-over-data functions 249, display data function 251, and keypad output functions 253. The media engine 241 processes data that is received from the first local area network 212, and data that is to be sent over the first local area network 212.

For data that is received from the first local area network 212, the media engine 241 may determine from the type of data in the packet whether packets contain sampled voice signals or data for performing other functions. Packets containing sampled voice signals are processed by voice over data function 249. The voice over data function 249 preferably conforms to a protocol for formatting voice signals as digital data streams. While any suitable protocol may be used, the media (voice signal) is preferably transported via the Real Time Protocol (RTP), which itself is carried inside of User Datagram Protocol (UDP). RTP is described in H. Schulzrinne et al., "RTP: A Transport Protocol for Real-Time Applications," IETF RFC 1889, January 1996, which is incorporated herein by reference. UDP is described in J. Postel, "User Datagram Protocol," IETF RFC 768, August 1980, and IP is described in J. Postel, ed., "Internet Protocol," IETF RFC 791, September 1981, both of which are incorporated by reference herein.

Packets containing data for use in registering the data network telephone 208 with a network telephony server are processed by the registration function 247. By registering the data network telephone 208, a user may establish with the network telephony service provider that calls addressed to the user's user identifier may be connected to the data network telephone 208. Registration may occur when the data network telephone 208 sends a request to register to a service provider host. The service provider host may respond by setting the user's user identifier to correspond to the telephone identifier of the data network telephone 208, and by acknowledging the request with a status message to the data network telephone 208. In one embodiment, a request to register the data network telephone 208 to a default user is automatically sent during power-up of the data network telephone 208.

Other features may be added to the registration functions 247, or implemented as extensions to the registration functions 247. For example, the data network telephone 208 may be provisioned to provide selected network telephony services by establishing a data connection with a service provider, requesting the selected services, and receiving data that ensures that the services have been successfully provisioned. Such services may include, for example, caller identification, call forwarding, voice mail and any other service offered by the network telephony service provider to enhance the capabilities of the data network telephone 208. One advantage of such provisioning functions is that services may be ordered for temporary use in a manner that is convenient to the user.

Packets containing data for display on the display device are processed by the display data function 251. The display data function 251 may be used for displaying, for example, the name(s) and user identifier(s) of the other party(-ies) to the call, the status of the telephone call, billing information, and other information For data that is to be sent over the data network 212, the media engine 241 formats the data as data packets in accordance with a selected protocol. The selected protocol is preferably the protocol that is supported by the data network telephone that will receive the data for the particular type of data being transported.

The voice-over-data function 249 formats voice samples according to the protocol used by the receiving data network telephone. In one preferred embodiment, the voice over data function 249 formats voice samples as RTP packets. The registration function 247 and the keypad output function 253 may control the transport of data that does not represent voice signals.

The data network telephones 218 and 228 are preferably similar or identical to the data network telephone 208.

5. The Portable Information Device (PID)

Figure 4:
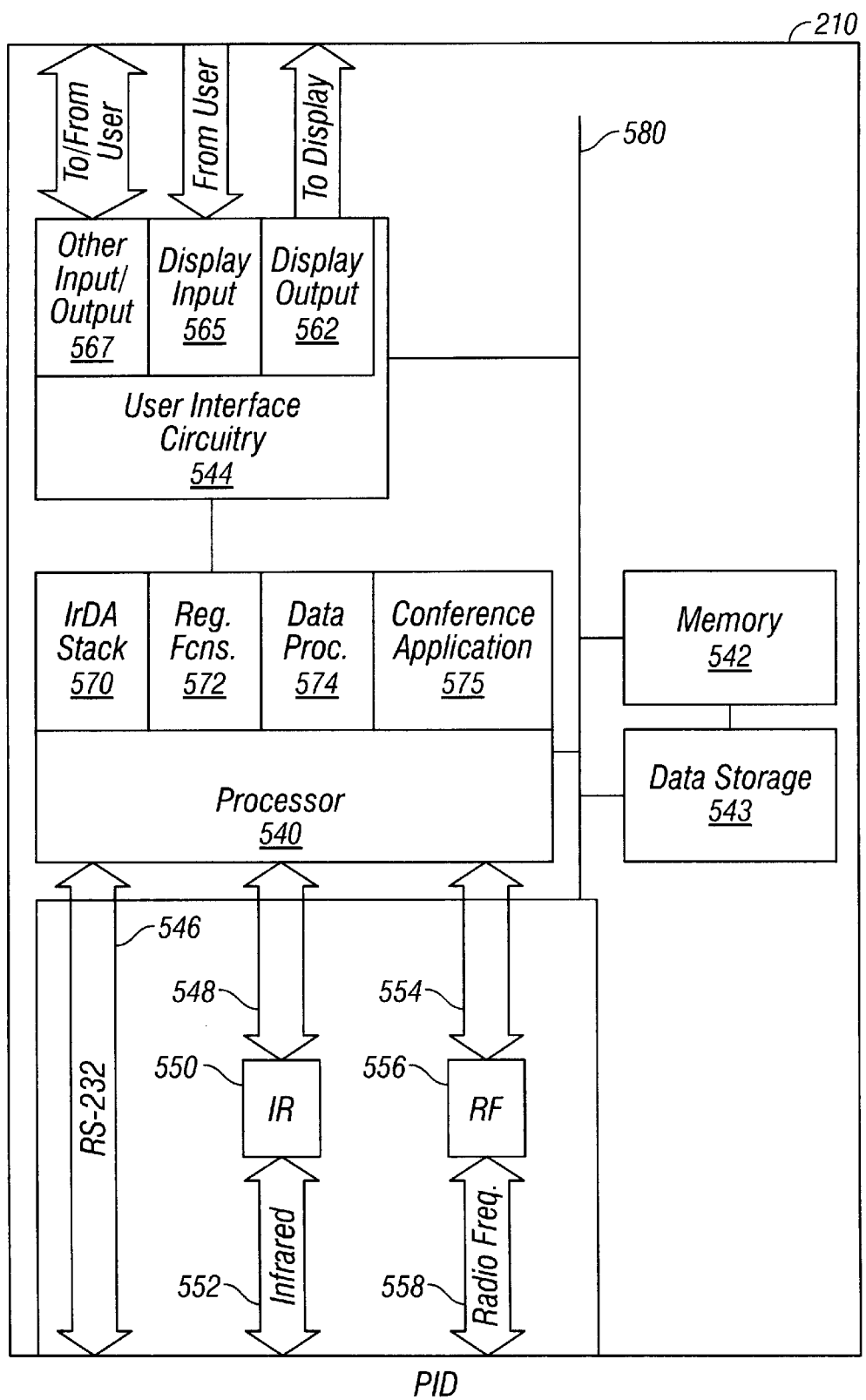
FIG. 4 is a block diagram of a portable information device (PID) according to an exemplary embodiment of the present invention.

FIG. 4 is a block diagram showing the PID 210 in communication with the data network telephone 208 having a connection to the first LAN 212. The PID 210 is linked to the data network telephone 208 by a point-to-point interface 545. A bus 580 may be used to connect the point-to-point interface 545 with a processor 540, a memory 542, data storage 543, and user interface circuitry 544.

The point-to-point interface 545 shown in FIG. 4 illustrates three alternative interfaces to a data network telephone.

A first alternative interface 546 includes a RS-232 serial connection and associated coupling hardware mechanisms. The first alternative interface 546 may, for example, be a docking cradle for a PID, in which information can be transferred between the PID 210 and the first data network telephone 208. The second alternative interface comprises a first connection 548, such as a RS-232 serial connection, along with infrared circuitry 250 for converting signals into infrared output and for accepting infrared input. An infrared interface 552 may also be included within the second alternative interface. The third alternative interface comprises a first connection 554, such as an RS-232 connection, along with radio-frequency circuitry 556 for converting signals into radio frequency output and for accepting radio frequency input. A radio frequency interface 558 may also be included as part of the third alternative interface.

The three alternative interfaces described above are merely examples, and additional means for implementing the interface between the PID 210 and the data network telephone 208 may also be used. Although three interfaces are shown in FIG. 4, there may be only one such interface in the PID 210. More than one interface may be included to improve flexibility and to provide redundancy in case of failure of an interface.

The user interface circuitry 544 includes hardware and software components that provide user input and output resources for functions in the processor 540. The user interface circuitry preferably includes a display output 562, a display input 565, and an additional input/output interface 567.

The display output 562 preferably receives digital information representing graphical or other data from the processor 540 and converts the information to a graphical display, such as text and/or images.

The display input 565 may receive PID data inputs from a user of the PID 210. The PID data inputs are preferably entered by the user with a stylus on a pressure-sensitive display screen. Similarly, the display output 562 preferably displays the PID data on the display screen.

The additional input/output interface 567 allows the user to enter other types of data besides PID data into the PID 210. For example, audio data, additional PID data, or additional input may be entered through the additional input/output interface 567. Touch-sensitive screen buttons are an exemplary mechanism for a user to enter control data into the PID 210.

The processor 540 includes an operating system and application and communication software, firmware, or hardware to implement the functions of the PID 210. The operating system may be any suitable commercially available operating system, or any proprietary operating system. The operating system and software may be stored on data storage 543. The conference application 575 preferably allows a user to select communication partners to be invited to a conference call initiated by the user of the PID 210. The conference application also should cause user identification information for the communication partners to be transmitted from the PID 210 to the first data network telephone 208 via the link 209. Although the processor 540 is shown connected to the data storage 543 through a bus 580, other configurations may also be used. Similarly, the memory 542 may be alternatively configured, and may be embedded within the processor 540.

The PID 210 is able to send data to and receive data from the data network telephone 208 across a point-to-point link, such as the point-to-point link 209 shown in FIG. 2. A user enters PID data at the display input 565. The PID data may be processed in the user interface circuitry 544 or it may go directly to the processor 540 or the memory 542. The processor 540 may also perform processing functions, such as compression. A PID data application may be used to implement the display input, the display output, and the processing functions. For example, a drawing application may be used to accept PID data input, the display input 565 from a user drawing with a stylus on the display screen of a PDA. A drawing application could then display the drawing through the display output 562 to enable the user to see a visual representation of the drawing. If the user desires to share the drawing with a second user on the system 200, where the second user is using a second PID, the PID data from the drawing application can be transmitted through one of the point-to-point interfaces 545, allowing the data to be received by the data network telephone 208. An application in the data network telephone 208 receives the PID data across the point-to-point link, and the PID data is prepared for transmission across the data network 206, such as by the media engine 241 shown in FIG. 3. Preferably the PID data is converted to PID data packets and is communicated on a PID data channel across the first LAN 212 through the router 213 across the data network 206 and eventually to a network device at which the second PID is located.

The point-to-point link 209 may be implemented as a serial bit stream-between an application in the PID 210 and an application in the first data network telephone 208. For example, the link 209 could be an infrared link that is implemented with minimal stack interpretation. However, the infrared link 209 between PID 210 and the first data network telephone 208 can alternatively be implemented using all or parts of a specialized protocol, such as the Infrared Data Association (IrDA) protocol stack, where data is interpreted through the stack between application-layer processes at each end of the link.

Figure 5:
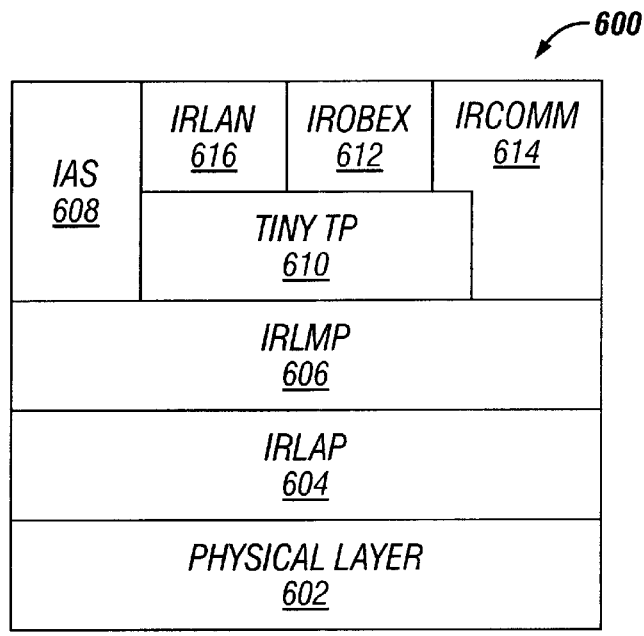
FIG. 5 is a stack layer diagram showing the layers of an IrDA stack.

FIG. 5 is a protocol diagram illustrating the layers of the IrDA protocol stack. An IrDA stack is implemented at each of the connection endpoints of an IrDA link. The required layers of an IrDA protocol stack are the physical layer 602, the IrLAP layer 604, the IRLMP layer 606 and the IAS layer 608. The physical layer 602 specifies optical characteristics of the link, encoding of data, and framing for various speeds. The IrLAP (Link Access Protocol) layer 604 establishes the basic reliable connection between the two ends of the link. The IrLMP (Link Management Protocol) layer 606 multiplexes services and applications on the IrLAP connection. The IAS (Information Access Service) layer 608 provides a directory or "yellow pages" of services on an IrDA device.

The IrDA protocol also specifies a number of optional protocol layers, these protocol layers being TinyTP 610, IrOBEX 612, IrCOMM 614 and IrLAN 616. TinyTP (Tiny Transport Protocol) 610 adds per-channel flow control to keep traffic over the IrDA link moving smoothly. This important function is required in many cases. IrOBEX (Infrared Object Exchange protocol) 612 provides for the easy transfer of files and other data objects between the IrDA devices at each end of the link. IrCOMM 614 is a serial and-parallel port emulation that enables existing applications that use serial and parallel communications to use IrDA without change. IrLAN (Infrared Local Area Network) 616 enables walk-up infrared LAN access for laptops and other devices. The use of the optional layers depends upon the particular application in the IrDA device. The IrDA protocol stack is defined by such standards documents as "IrDA Serial Infrared Physical Layer Link Specification", "IrDA 'IrCOMM': Serial and Parallel Port Emulation over IR (Wire Replacement)", "IrDA Serial Infrared Link Access Protocol (IrLAP)", "IrDA Infrared Link Management Protocol (IrLMP)", and "IrDA 'Tiny TP': A Flow-Control Mechanism for use with IrLMP", and related specifications published by the IrDA and available at http://www.irda.org/standards/specifications.asp and is incorporated by reference herein.

In one embodiment, the data network telephones 208, 218, and 228 merely provide a data tunnel for the data channel attendant to the infrared links, while the IrDA protocol stack is implemented at endpoint PID devices, such as PID 210. Alternatively, IrDA stacks can be implemented in the data network telephones as well. By implementing additional layers of the IrDA protocol stack, the PID applications and the base applications in the data network telephones can be simplified because the IrDA protocol layers take over certain functions. For example, the IrDA protocol stack can be implemented at each PID used in a conference call, and the IrOBEX layer 612 can be used to transfer text and graphics object files, such as drawings or electronic business cards, end-to-end between PID devices connected via data network telephones and networks.

6. Providing Telephony and Conferencing Services

Figure 6:
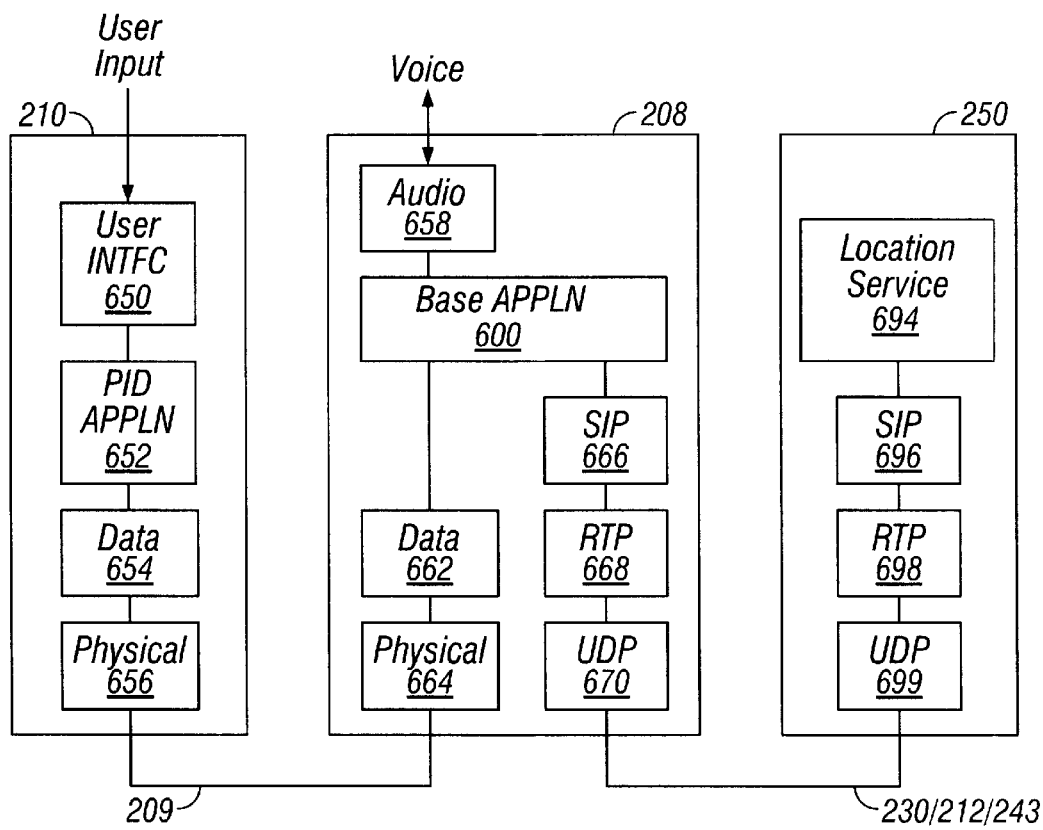
FIG. 6 is a block and stack layer diagram illustrating the protocol stacks in an exemplary embodiment of a PID linked to a data network telephone.

FIG. 6 is a functional block diagram and protocol stack diagram illustrating an embodiment of the protocol stacks in the PID 210 and the first data network telephone 208 that support link 209. In the infrared RS-232 embodiment, the point-to-point interface circuitry 545 in the PID 210 provides the physical layer 656, such as that specified by the Infrared Data Association (IrDA), that connects via link 209 to the point-to-point interface circuitry 260 implementing a physical layer 664 in the first data network telephone 208. The data link layer 654 in PID 210 provides data link control for link 209 in transferring data to and from a PID application client 652. Similarly, the first data network telephone 208 includes a data link layer 662 and a base application server 600 that is configured to synchronize connection and other functions with the PID application 656 in PID 210.

When PID 210 is activated, either through power-up or through a user input at the user interface 650, the synchronization application client 652 in the PID 210 may send the user's SIP URL across the link 209 to the first data network telephone 208, where it is received by the synchronization application server 600. The synchronization application server 600 sends the SIP URL received from the PID 210 across connection 230 and the Ethernet LAN 212 through connection 243 to the network telephony connection server 250. The network telephony connection server 250 may store the SIP URL and the IP address of the associated data network telephone 208 in a SIP database (not shown) so that the SIP URL is listed as being resident at the IP address of the data network telephone 208. (If the network telephony connection server 250 uses a location server for registration/location tasks, the registration information might instead be stored with such a location server). SQL (Structured Query Language) is preferred for implementing and maintaining the database. Once the PID 210 is registered with the network telephony connection server 250, calls to the SIP URL for PID 210 (or the user of the PID 210) will be directed to the first data network telephone 208.

Figure 7:
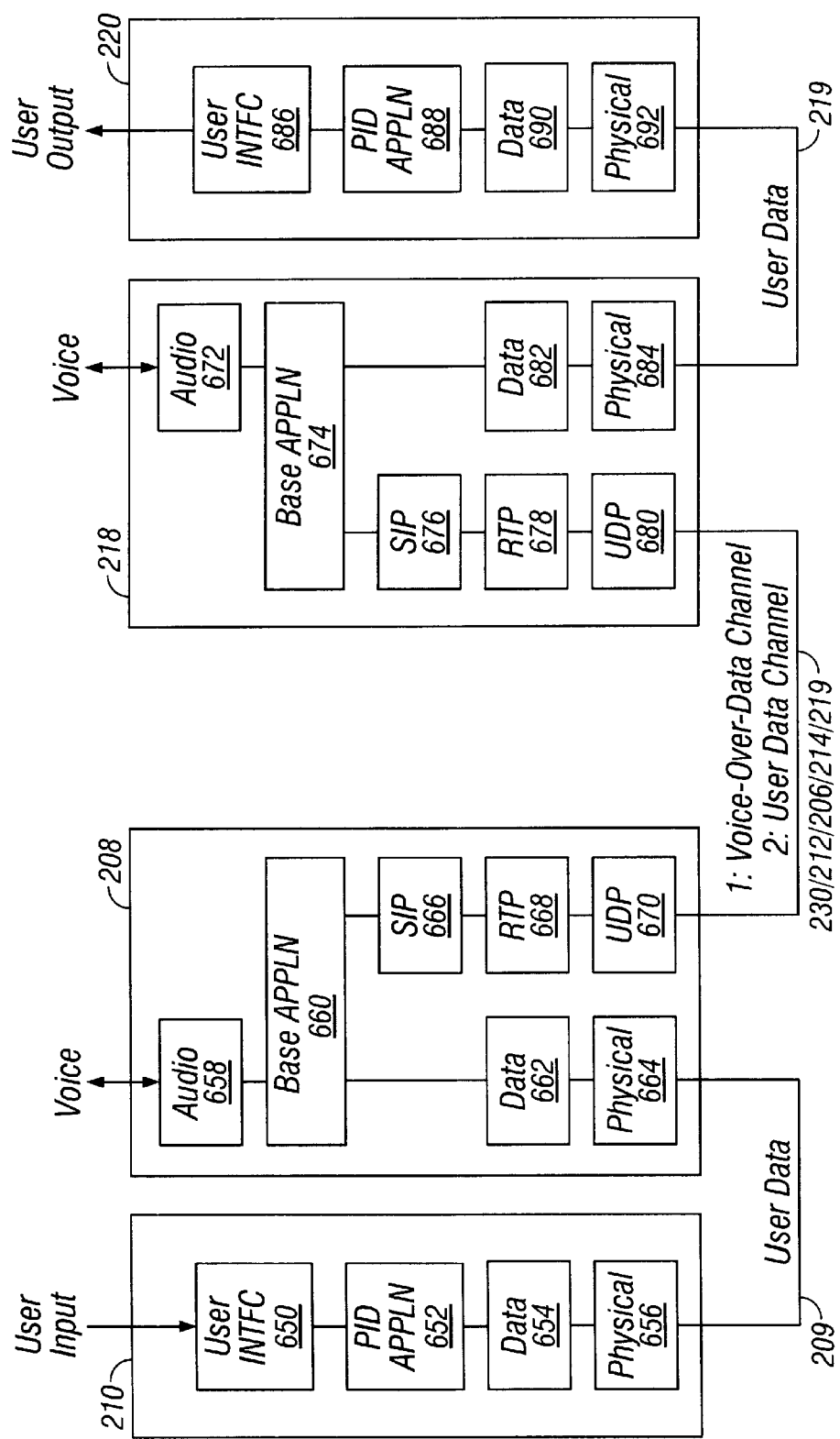
FIG. 7 is block and stack layer diagram illustrating an embodiment of the present invention in which a SIP call may be established.

FIG. 7 is a functional block and protocol stack diagram illustrating an embodiment of the present invention where a SIP connection is established from the first data network phone 208 to the second data network phone 218 through network connection 230, first access network 212, data network 206, second access network 214 and network connection 219. The routers 213 and 215 and associated connections are not shown to simplify the block diagram representation. Although only two data network telephones are shown in FIG. 7, a three-party conference call would be very similar to what is shown in FIG. 7.

The diagram of FIG. 7 shows how PID data can be communicated from one PID to another PID during a conference call in one aspect of the present invention. The PID application 652 in PID 210 is configured to send PID data input through the user interface 650 through link 209 to base application 660 in the first data network phone 208. In this embodiment, base application 660 is configured to define data channels for transport to the second data network telephone 218.

Multiple data channels in SIP may be defined through the Session Description Protocol described in RFC 2327, herein incorporated by reference. Included in a SIP INVITE request for a connection are options for the requested connection that describe the number and type of media streams. Each media stream is described by a "m=" line in the INVITE request. For example, a request for a connection that includes an audio stream and a bidirectional video stream using H.261 might look like this:

v=0 o=alice 2890844526 2890844526 IN IP4 host.anywhere-.com c=IN IP4 host.anywhere.com m=audio 49170 RTP/AVP 0 a=rtpmap:0 PCMU/8000 m=video 51372 RTP/AVP 31 a=rtpmap:31 H261/90000

TABLE 1

If the called device includes functionality to receive the connection as described in Table 1, then the called device will respond to the INVITE request with a 200 OK response that includes the same option values. If the called device or party is unable or unwilling to receive such a connection, then it will respond with alternative option values for the connection. See RFC 2543 for further details regarding the negotiation of connection parameters in SIP.

In FIG. 7, a first data channel for voice data and a second data channel for PID data have been negotiated by the base applications 660 in the first data network telephone 208 and the base application 674 in the second data network telephone 218. The base applications 660 and 674 transfer voice data between the AUDIO applications, such as applications including G.711 encoders, in each phone via the first data channel. The base application 660 in phone 208 is also configured to send the PID data received via link 209 from PID 210 to the base application 674 in phone 218 via the second data channel. The base application in phone 218 is configured to forward the PID data received via the second data channel to a second PID 220 via a second link 221. The PID application 688 in PID 220 then outputs the PID data received from phone 218 to the user interface 686 for output to the user of PID 220.

The PID data in FIG. 5 can take a variety of forms. For example, the PID data can be a text file containing information about the user of PID 210, such as an electronic business card. The PID data can also be drawing data generated by graphical applications in the PIDs 210 and 220 whereby a user drawing on a touchscreen of the user interface 650 in PID 210 generates corresponding PID data that is transmitted via the second data channel to PID 220a for display on the user interface 686 of PID 220a. The media description for the media stream can be defined during connection setup to establish a connection appropriate to the type of data being transferred. These examples represent just a few of the applications for this aspect of the present invention and should not be viewed as limiting the present invention.

In one embodiment, RTP data packets for two or more types of data are exchanged between the first data network telephone 208 and the second data network telephone 218a according to one of three possible methods. In the first method, one RTP data channel (or RTP stream) on UDP carries data packets in which both data types are present in single split packets. Each such split packet contains (1) a source port number and a destination port number in the UDP portion, and (2) a special payload sequentially including each of the data types in the RTP portion. The special payload type can be defined in the SDP described with reference to FIG. 6. Other information is also contained in each packet as well. In the second method for transmitting two or more data types, a separate RTP over UDP data channel is created for each of the different data types, and the RTP header indicates which type of data is contained in each packet. For example, voice data coded as G.711 might be assigned a payload type code of 0, while PID data is assigned a payload type code of 190. In the third method for transmitting two or more data types, a single RTP/UDP data channel (RTP/UDP stream) is created that contains data packets of two or more different types. In this method, the data types are identified in a payload type field in the RTP header of each packet, enabling an underlying application to identify which data packets are voice data packets and which data packets are PID data packets, for example.

Figure 8A:
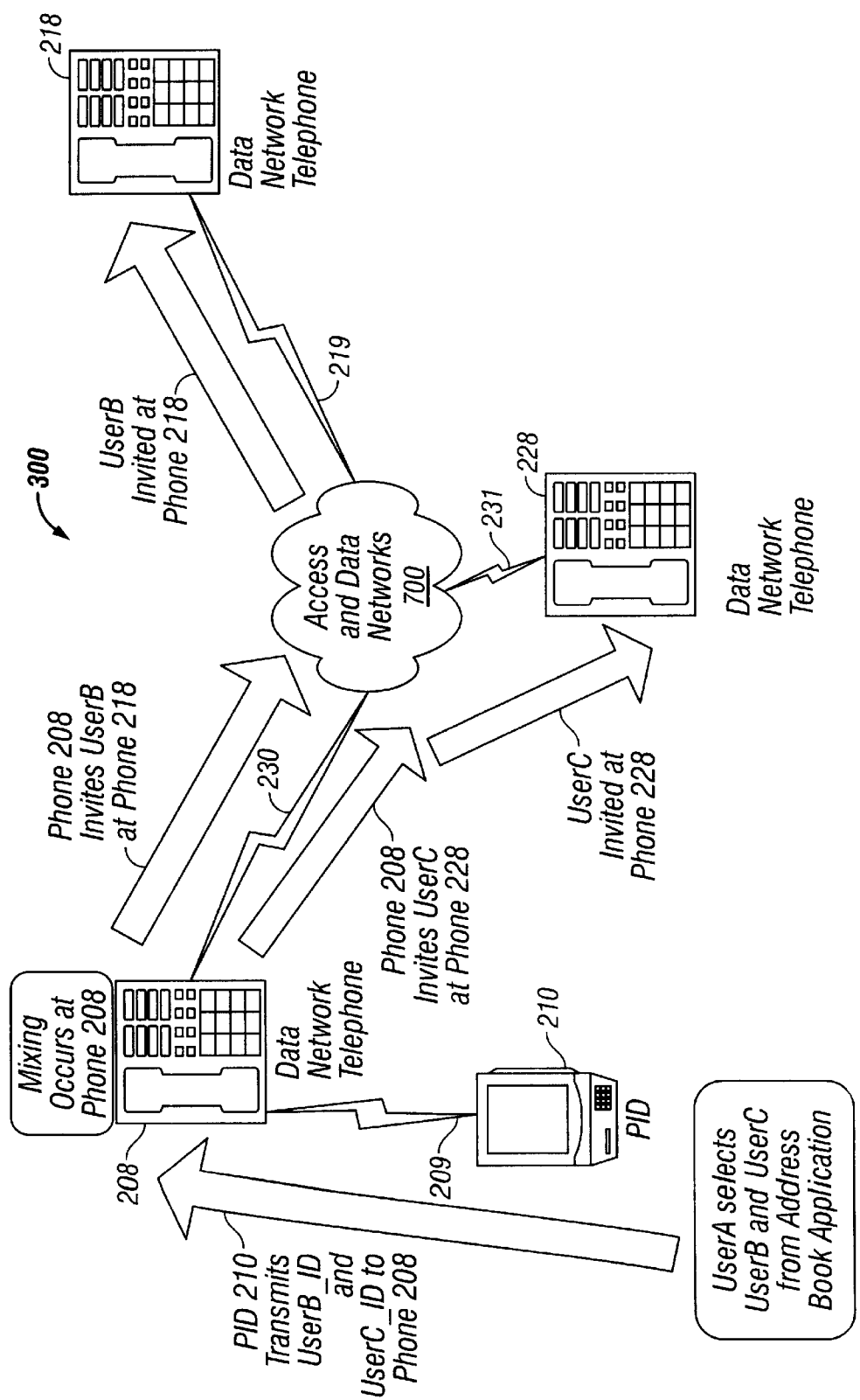
FIG. 8A is a block and message flow diagram showing a system for establishing a conference call on a telephony network, according to a first embodiment of the present invention.

FIG. 8A is a block and message flow diagram showing a system 300 for using a PID 210 to establish a conference call on a telephony network, according to a first embodiment of the present invention. A single internetwork 700 represents the combination of any access networks at which data network telephones 208, 218, and 228 reside, any data networks connecting any existing access networks, and any routers, bridges, or other similar devices. For purposes of illustration, it will be assumed that UserA is associated with the PID 210 and is located at (registered with) the first data network telephone 208. UserB is located at (registered with) the second data network telephone 218. UserC is located at (registered with) the third data network telephone 228.

UserA initiates a conference call to Users B and C by causing the PID 210 to transmit user identifiers (such as SIP URLs) of the desired communication partners (such as UserB and UserC) to the first data network telephone 208. For example, UserA can select the names or user identifiers of UserB and UserC in an address book application located on the PID 210. A call application on the PID 210 may then be used to transmit the user identifiers across the link 209 to the first data network telephone 208.

The first data network telephone 208 performs call-management procedures to initiate the call to the desired communication partners. If SIP is utilized as the call-management protocol, then the first data network telephone transmits INVITE requests to the network elements (such as data network telephones) at which the communication partners are located (or registered). If the first data network telephone does not know where the communication partners are registered, the first data network telephone will likely utilize at least one network telephony connection server (not shown in FIG. 8A) to locate the communication partners and transmit appropriate INVITE requests. When the communication partners (UserB and UserC) receive the INVITE requests at the second and third data network telephones 218 and 228, they may either accept or reject the requests. Assume that UserB and UserC both accept the INVITE requests by transmitting a 200 OK message according to SIP. After any necessary acknowledgement messages are transmitted by the first data network telephone to the second and third data network telephones 218 and 228, data channels may be created (1) between the first data network telephone 208 and the second data network telephone 218, and (2) between the first data network telephone 208 and the third data network telephone 228. Note that there need not be a data channel created between the second data network telephone 218 and the third data network telephone 228. This is because the first data network telephone 208 had data channels to all other communication partners, and is therefore able to mix all incoming data channel streams so that UserB is able to receive UserC's communications and vice-versa.

The system 300 in FIG. 8A has the advantage of being relatively simple to set up, but may not scale as well as other systems as more users are added to the conference call. This is due to the fact that mixing for all the parties is occurring at the first data network telephone 208. It is however possible for additional communication partners to be invited by data network telephones other than the first data network telephone 208, in which case some of the mixing may occur at other data network telephones as well.

Figure 8B:
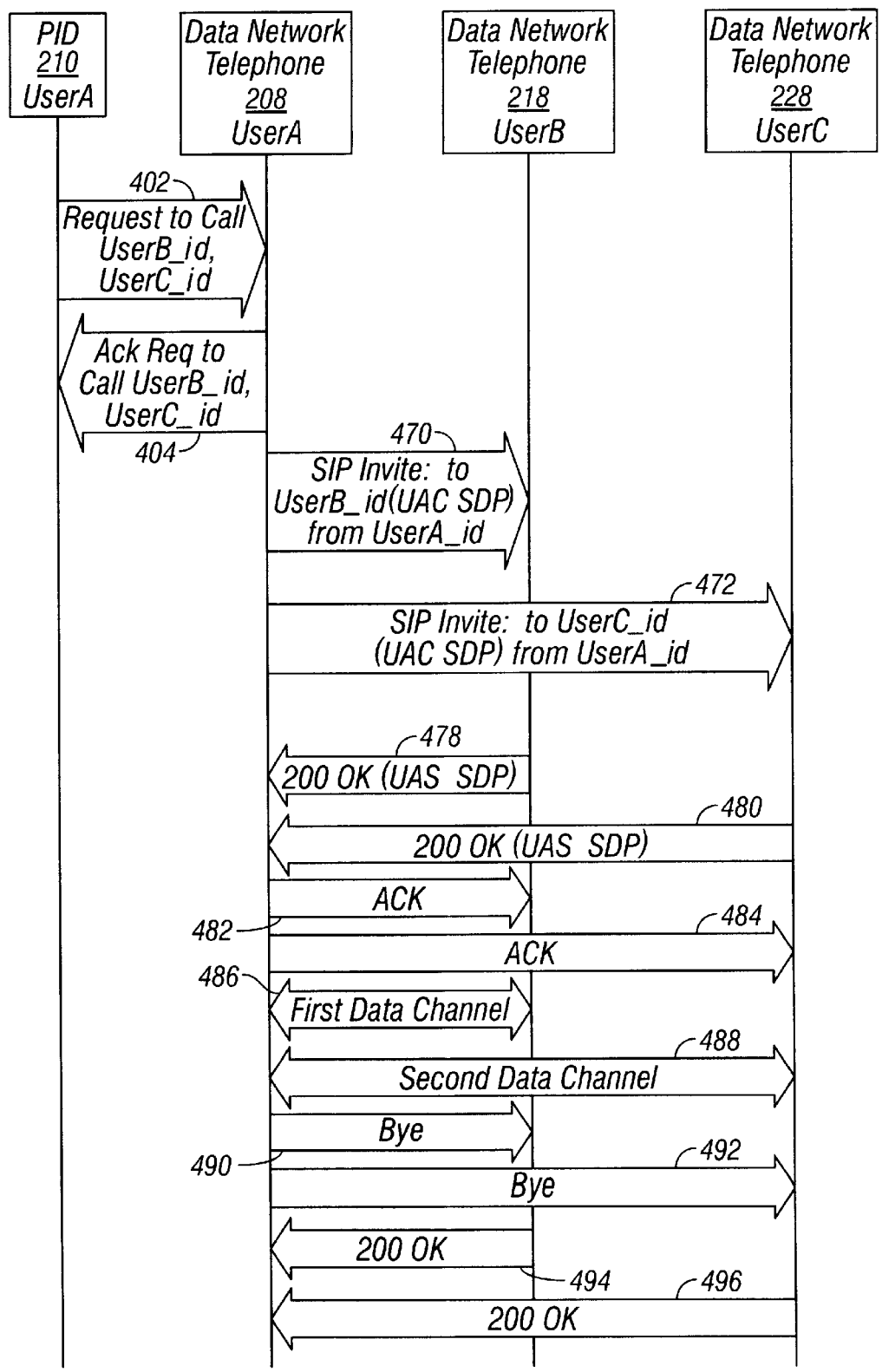
FIG. 8B is a message flow diagram showing an exemplary flow of messages in a system for establishing a conference call on a telephony network, according to a first embodiment of the present invention.

FIG. 8B is a message flow diagram showing an exemplary flow of messages in a system 300 for using a PID 210 to establish a conference call on a telephony network, according to a first embodiment of the present invention. A PID 210 associated with a UserA transmits a request 402 to a first data network telephone 208 to call UserB at UserB_id and UserC at UserC_id. UserB_id and UserC_id may be SIP URLs, for example. The first data network telephone 208 may acknowledge the request to call UserB and UserC by sending an acknowledgement message 404. The first data network telephone 208 then may attempt to connect UserB by sending a first INVITE message 470, preferably containing UserA session information in SDP (Session Description Protocol) format, to a second data network telephone 218 associated with UserB. A network telephony access server, such as the second network telephony access server 238 may be accessed to locate the second data network telephone as being registered with UserB. Similarly, the first data network telephone 208 then may attempt to connect UserC by sending a second INVITE message 472, preferably containing UserA session information in SDP format, to a third data network telephone 228 associated with UserC. A network telephony access server, such as the third network telephony access server 237 may be accessed to locate the third data network telephone as being registered with UserC. The second and third data network telephones 218 and 228 then may respond by sending separate 200 OK messages 478 and 480 if SIP is being used as the call-management protocol. The first data network telephone 208 may acknowledge the responses 478 and 480 by transmitting ACK messages 482 and 484 to the second and third data network telephones 218 and 228.

After the call has been initiated according to the procedure described above, communications can be transmitted over data channels created by the data network telephones 208, 218, and 228. A first data channel 486 is created between the first data network telephone 208 and the second data network telephone 218. A second data channel 488 is created between the first data network telephone 208 and the third data network telephone 228. Additional data channels may also be created to communicate information between the data network telephones. For example, a third data channel may be created between the first data network telephone 208 and the second data network telephone 218 to allow PID data, such as graphical display data, to be communicated between the first and second data network telephones 208 and 218. If UserA decides to terminate the call, UserA can cause the first data network telephone 208 to transmit a first BYE message 490 to the second data network telephone 218 and a second BYE message 492 to the third data network telephone 228. The second and third data network telephones 218 and 228 may respond by sending 200 OK messages 494 and 496 to the first data network telephone 208. Variations of the messages described above can also be used, such as if a call-management protocol other than SIP is used.

Figure 9A:
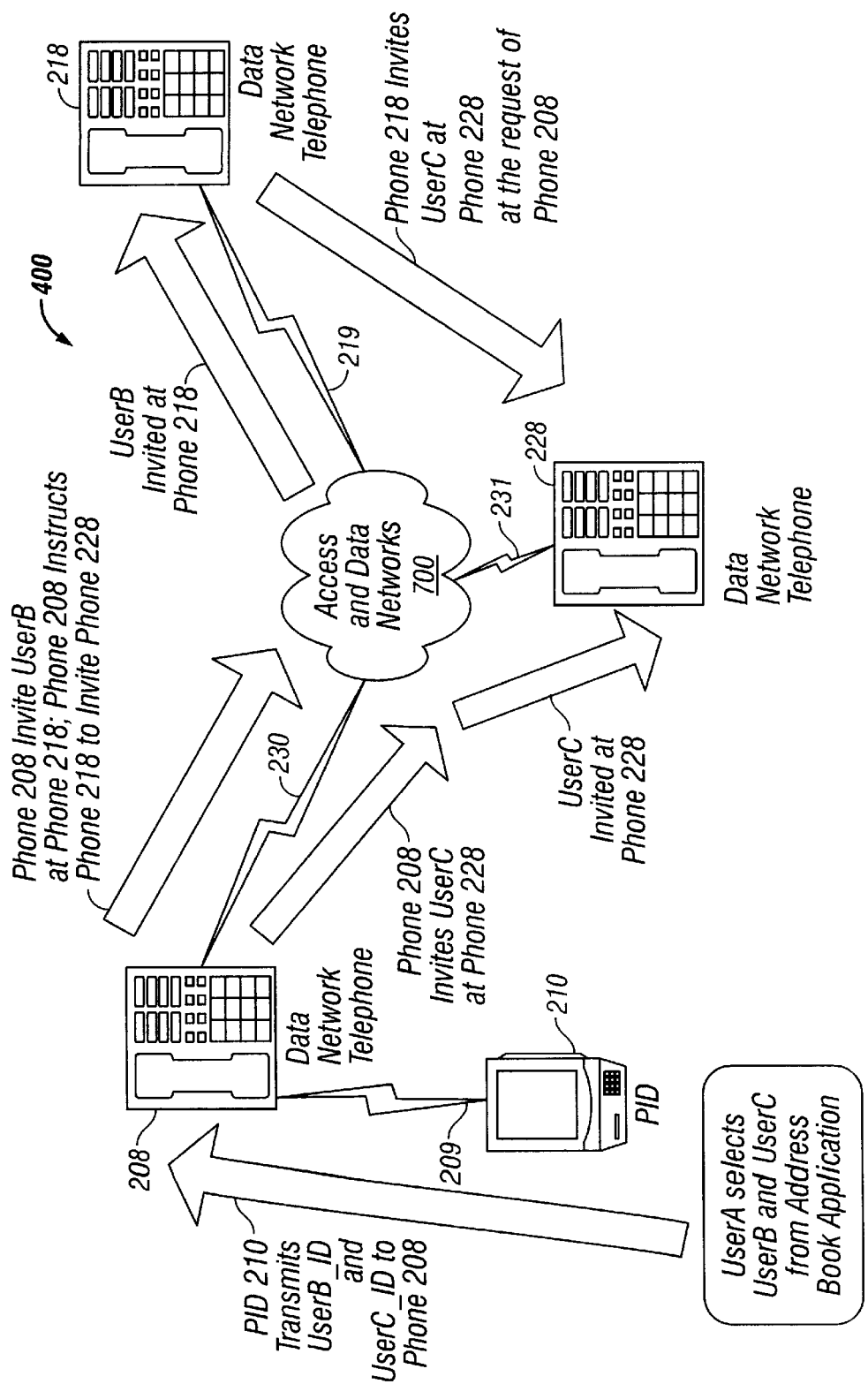
FIG. 9A is a block and message flow diagram showing a system for establishing a conference call on a telephony network, according to a second embodiment of the present invention.

FIG. 9A is a block and message flow diagram showing a system 400 for using a PID 210 to establish a conference call on a telephony network, according to a second embodiment of the present invention. A single internetwork 700 again represents the combination of any access networks at which data network telephones 208, 218, and 228 reside, any data networks connecting any existing access networks, and any routers, bridges, or other similar devices. For purposes of illustration, it will be assumed that UserA is associated with the PID 210 and is located at (registered with) the first data network telephone 208. UserB is located at (registered with) the second data network telephone 218. UserC is located at (registered with) the third data network telephone 228.

UserA initiates a conference call to Users B and C by causing the PID 210 to transmit user identifiers (such as SIP URLs) of the desired communication partners (such as UserB and UserC) to the first data network telephone 208. For example, UserA can select the names or user identifiers of UserB and UserC in an address book application located on the PID 210. A call application on the PID 210 may then be used to transmit the user identifiers across the link 209 to the first data network telephone 208.

The first data network telephone 208 performs call-management procedures to initiate the call to the desired communication partners. If SIP is utilized as the call-management protocol, then the first data network telephone transmits INVITE requests to the network elements (such as data network telephones) at which the communication partners are located (or registered). If the first data network telephone does not know where the communication partners are registered, the first data network telephone will likely utilize at least one network telephony connection server (not shown in FIG. 9A) to locate the communication partners and transmit appropriate INVITE requests.

In the example shown in FIG. 9A, the first data network telephone 208 has instructed the second data network telephone 218 to transmit an INVITE request to the third data network telephone 228. If SIP, with the call control draft extension (H. Schulzrinne et al., draft-ietf-mmusic-sip-cc-01.txt, Internet Engineering Task Force), is being used as the call-management protocol, this instruction can be specified in an "also" header of the SIP INVITE message. When the second data network telephone 218 receives such an INVITE message with the "also" header indicating that the second data network telephone 218 should invite the third data network telephone 228, the second data network telephone should send an INVITE request to the third data network telephone 228 with an indication in the INVITE request that the INVITE request was transmitted at the direction of the first data network telephone 208.

When the communication partners (UserB and UserC) receive the INVITE requests at the second and third data network telephones 218 and 228, they may either accept or reject the requests. Assume that UserB and UserC both accept the INVITE requests by transmitting a 200 OK message according to SIP. After any necessary acknowledgement messages are transmitted by the first data network telephone to the second and third data network telephones 218 and 228, and by the second data network telephone 218 to the third data network telephone 228, data channels may be created (1) between the first data network telephone 208 and the second data network telephone 218, (2) between the first data network telephone 208 and the third data network telephone, and (3) between the second data network telephone 218 and the third data network telephone 228. Note that in this embodiment, a data channel is created between the second data network telephone 218 and the third data network telephone 228. Therefore, the first data network phone 208 need not provide mixing services for UserB and UserC to be able to communicate with each other.

Figure 9B:
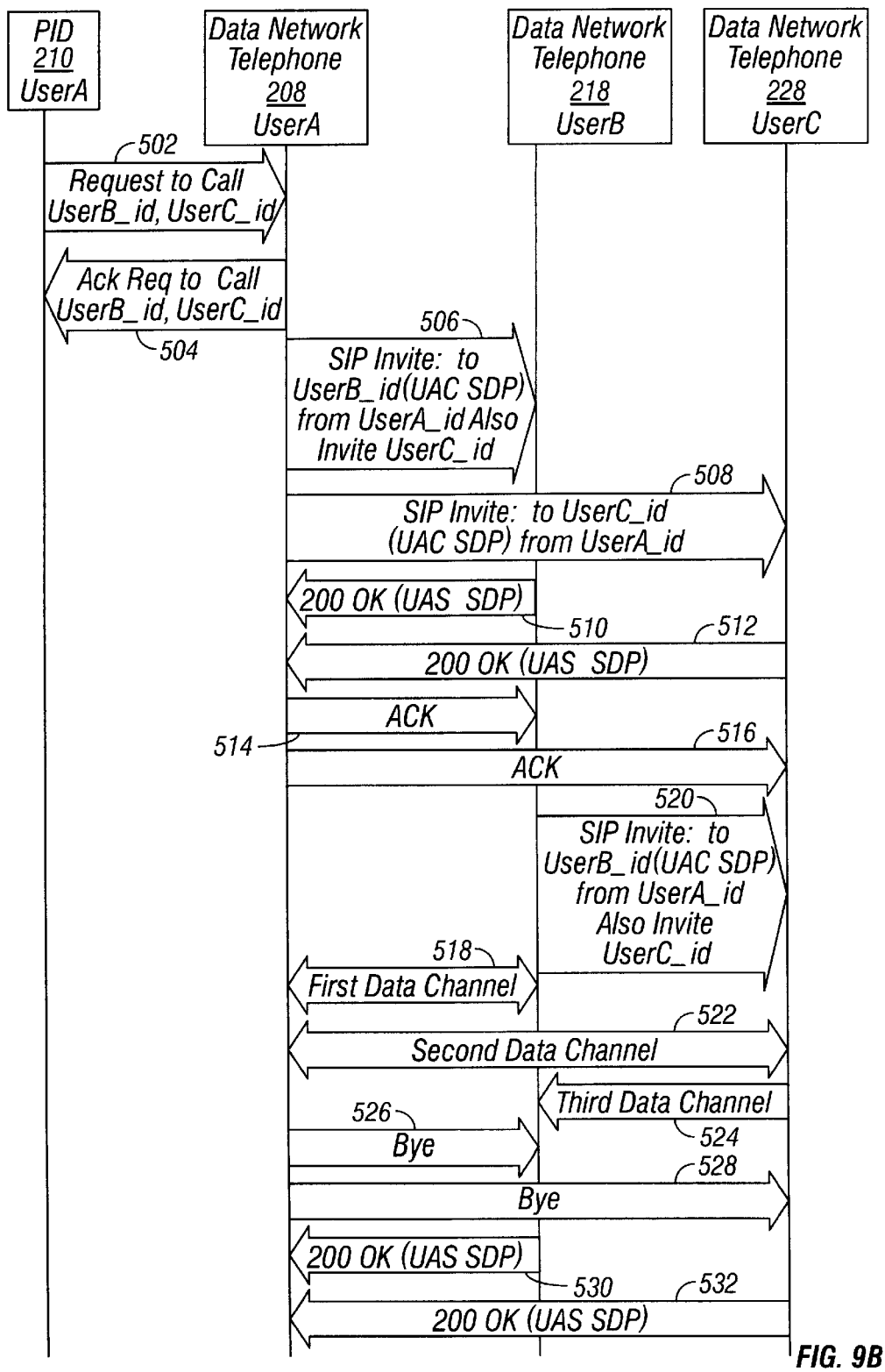
FIG. 9B is a message flow diagram showing an exemplary flow of messages in a system for establishing a conference call on a telephony network, according to a second embodiment of the present invention.

FIG. 9B is a message flow diagram showing an exemplary flow of messages in a system 400 for using a PID 210 to establish a conference call on a telephony network, according to a second embodiment of the present invention. A PID 210 associated with the UserA transmits a request 502 to a first data network telephone 208 to call UserB at UserB_id and UserC at UserC_id. UserB_id and UserC_id may be SIP URLs, for example. The first data network telephone 208 may acknowledge the request to call UserB and UserC by sending an acknowledgement message 504. The first data network telephone 208 may attempt to connect UserB by sending a first INVITE message 506, preferably containing UserA session information in SDP (Session Description Protocol) format, to the second data network telephone 218 associated with UserB. In this embodiment, the INVITE request message 506 is a SIP INVITE request message that includes the call control draft extension (H. Schulzrinne et al., draft-ietf-mmusic-sip-cc01.txt, Internet Engineering Task Force), to allow the first data network telephone 208 to instruct the second data network telephone 218 to send an INVITE request to the third data network telephone 228 by using an "also" header in the SIP INVITE message 506. A network telephony access server, such as the second network telephony access server 238 may be accessed to locate the second data network telephone as being registered with UserB. Similarly, the first data network telephone 208 then may attempt to connect UserC by sending a second INVITE message 508, preferably containing UserA session information in SDP format, to a third data network telephone 228 associated with UserC. A network telephony access server, such as the third network telephony access server 237 may be accessed to locate the third data network telephone as being registered with UserC. The second and third data network telephones 218 and 228 then may respond by sending separate 200 OK messages 510 and 512 if SIP is being used as the call-management protocol. The first data network telephone 208 may acknowledge the responses 510 and 512 by transmitting ACK messages 514 and 516 to the second and third data network telephones 218 and 228.

After the call has been initiated according to the procedure described above, communications can be transmitted over data channels created by the data network telephones 208, 218, and 228. A first data channel 518 is created between the first data network telephone 208 and the second data network telephone 218. A second data channel 522 is created between the first data network telephone 208 and the third data network telephone 228. A third data channel 524 is created between the second data network telephone 218 and the third data network telephone 228. Additional data channels may also be created to communicate information between the data network telephones. Voice data as well as other data types may be communicated across the data channels. If UserA decides to terminate the call, UserA can cause the first data network telephone 208 to transmit a first BYE message 526 to the second data network telephone 218 and a second BYE message 528 to the third data network telephone 228. The second and third data network telephones 218 and 228 may respond by sending 200 OK messages 530 and 532 to the first data network telephone 208. Variations of the messages described above can also be used, such as if a call-management protocol other than SIP is used.

Figure 10A:
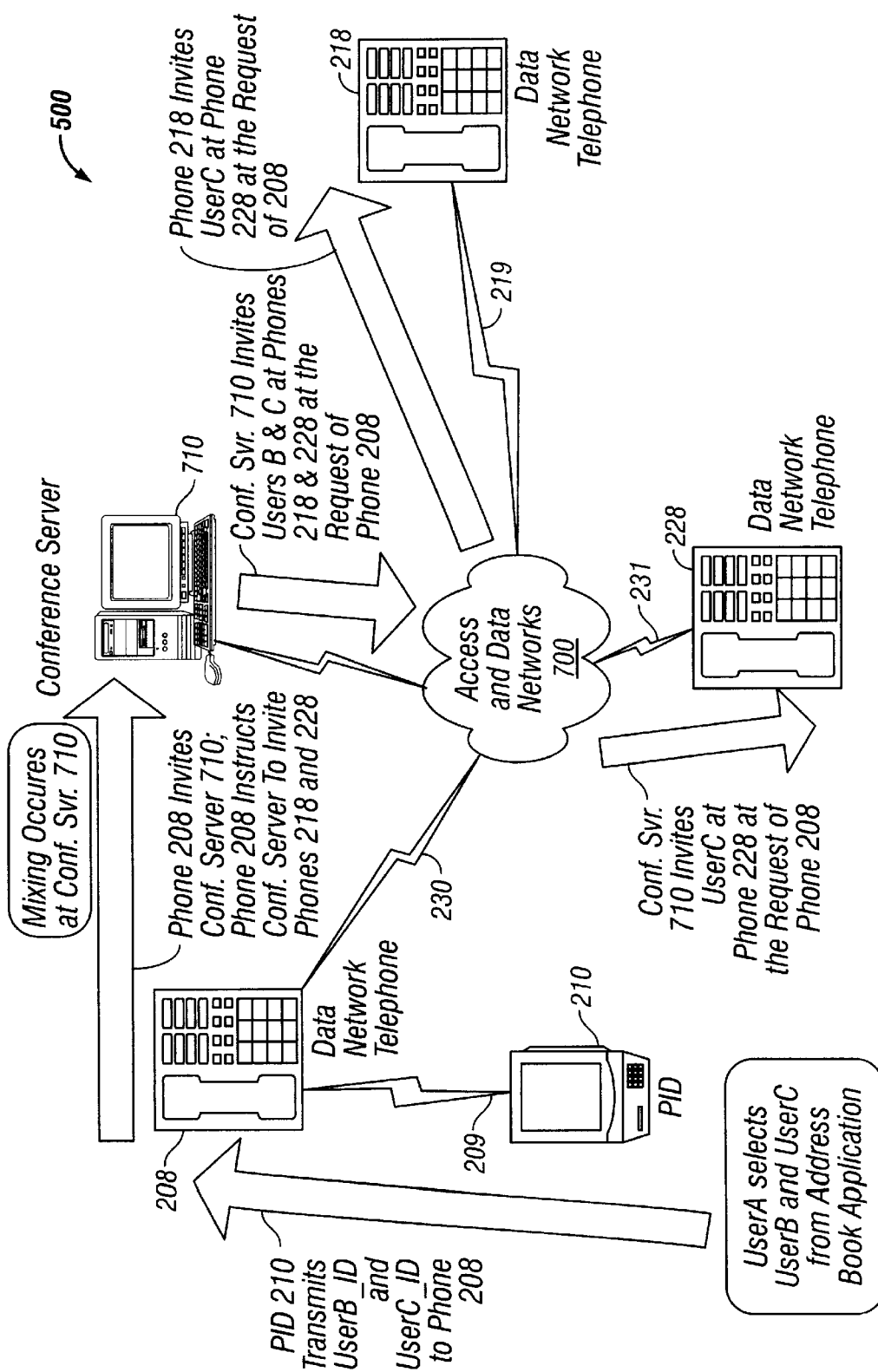
FIG. 10A is a block and message flow diagram showing a system for establishing a conference call on a telephony network, according to a third embodiment of the present invention.

FIG. 10A is a block and message flow diagram showing a system 500 for using a PID 210 to establish a conference call on a telephony network, according to a third embodiment of the present invention. A single internetwork 700 represents the combination of any access networks at which data network telephones 208, 218, and 228 reside, any data networks connecting any existing access networks, and any routers, bridges, or other similar devices. A conference server 710 is shown connected to the internetwork 700, but may be connected to any data network or access network within the internetwork 700, including an access network other than one to which the data network telephones 208, 218, and 228 are connected. For purposes of illustration, it will be assumed that UserA is associated with the PID 210 and is located at (registered with) the first data network telephone 208. UserB is located at (registered with) the second data network telephone 218. UserC is located at (registered with) the third data network telephone 228.

UserA initiates a conference call to Users B and C by causing the PID 210 to transmit user identifiers (such as SIP URLs) of the desired communication partners (such as UserB and UserC) to the first data network telephone 208. For example, UserA can select the names or user identifiers of UserB and UserC in an address book application located on the PID 210. A call application on the PID 210 may then be used to transmit the user identifiers across the link 209 to the first data network telephone 208.

The first data network telephone 208 performs call-management procedures to initiate conference call. If SIP is utilized as the call-management protocol, then the first data network telephone 208 transmits an INVITE request to the conference server 710. In the example shown in FIG. 10A, the INVITE request instructs the conference server 710 to transmit INVITE requests to the second and third data network telephones 218 and 228. If SIP, with the call control draft extension (H. Schulzrinne et al., draft-ietf-mmusic-sip-cc-01.txt, Internet Engineering Task Force), is being used as the call-management protocol, the first data network telephone 208 can specify this instruction in an "also" header of the SIP INVITE message. When the conference server 710 receives such an INVITE message with the "also" header indicating that the conference server 710 should invite the second and third data network telephones 218 and 228, the conference server 710 should send INVITE requests to the second and third data network telephones 218 and 228 with an indication in the INVITE request that the INVITE request was transmitted at the direction of the first data network telephone 208.

When the communication partners (UserB and UserC) receive the INVITE requests at the second and third data network telephones 218 and 228, they may either accept or reject the requests. Assume that UserB and UserC both accept the INVITE requests by transmitting a 200 OK message according to SIP. After any necessary acknowledgement messages are transmitted by the second and third data network telephones 218 and 228 to the conference server 710, data channels may be created (1) between the first data network telephone 208 and the conference server 710, (2) between the second data network telephone 218 and the conference server 710, and (3) between the third data network telephone 228 and the second data network telephone 218. Note that in this embodiment, no data channel needs to be created between any of the first, second, or third data network telephones 208, 218, and 228. This is because the conference server has data channels to all of the data network telephones participating in the conference call, and is therefore able to mix all incoming data channel streams so that each of the data network telephones 208, 218, and 228 is able to communicate with every other data network telephone.

FIG. 10B is a message flow diagram showing an exemplary flow of messages in a system 400 for using a PID 210 to establish a conference call on a telephony network, according to a third embodiment of the present invention. A PID 210 associated with the UserA transmits a request 834 to a first data network telephone 208 to set up a conference call that includes UserB at UserB_id and UserC at UserC_id. UserB_id and UserC_id may be SIP URLs, for example. The first data network telephone 208 may acknowledge the request to call UserB and UserC by sending an acknowledgement message 836. The first data network telephone 208 sends an INVITE message 838 to a conference server 710. The INVITE message 838 is preferably a SIP INVITE request message that includes the call control draft extension (H. Schulzrinne et al., draft-ietf-mmusic-sip-cc-01.txt, Internet Engineering Task Force), to allow the first data network telephone 208 to instruct the conference server 710 to send INVITE requests to the second and third data network telephones 218 and 228 by using an "also" header in the SIP INVITE message 838. The conference server 710 responds with a 200 OK message 840, and the first data network telephone 208 sends an acknowledgment message 843. The conference server 710 proceeds to transmit INVITE messages 842 and 844 to the second and third data network telephones 218 and 228. The second and third data network telephones 218 and 228 respond with 200 OK messages 846 and 848 to the conference server 710 that include SDP (Session Description Protocol) information corresponding to the second and third data network telephones 218 and 228. Network telephony access servers, such as the second network telephony access servers 250, 238, and 237 may be accessed to locate the data network telephones 218 and 228, and the conferenc server 710. The conference server 710 acknowledges the responses of the second and third data network telephones 218 and 228 with ACK messages 850 and 852.

Figure 11:
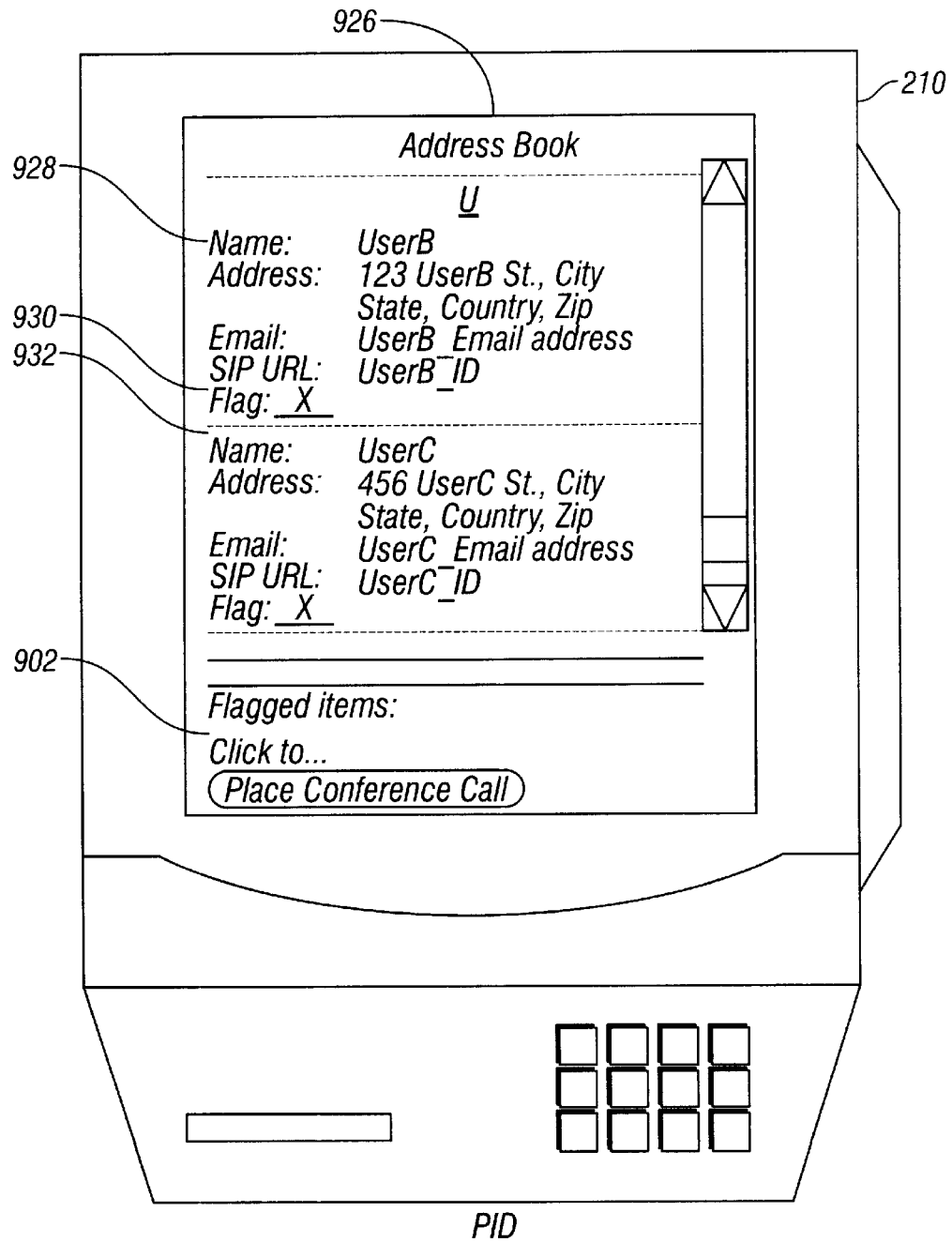
FIG. 11 is a pictorial diagram showing an exemplary display screen of a PID displaying entries from an address book application according to one embodiment of the present invention.

After the conference call has been set up according to the procedure described above, communications can be transmitted over data channels created by the data network telephones 208, 218, and 228, and the conference server 710. A first data channel 854 is created between the first data network telephone 208 and the conference server 710. A second data channel 856 is created between the second data network telephone 218 and the conference server 710. A third data channel 858 is created between the third data network telephone 228 and the conference server 710. Additional data channels may also be created to communicate information between the data network telephones. Voice data as well as other data types may be communicated across the data channels. Mixing is controlled by a mixture in the conference server 710 so that all parties to the conference call hear all communications, if desired. If UserA decides to terminate the call, UserA can cause the first data network telephone 208 to transmit a BYE message 860 to the conference server 710. The conference server 710 may respond by sending a 200 OK messages 862 to the first data network telephone 208. Variations of the messages described above can also be used, such as if a call-management protocol other than SIP is used FIG. 11 is a pictorial diagram showing an exemplary display screen 902 of a PID 210 displaying entries from an address book application 926 according to one embodiment of the present invention. Shown are a first contact entry 928 and a second contact entry 932. The entries each contain contact information, such as name, address, email, SIP URL, and other information. In the preferred embodiment, the user of the PID 210 is given the option to flag entries in the address book, such as by checking a flag field 930 in the contact entry 928. When the communication parties to the impending conference call have been flagged (UserB 928 and UserC 932 in FIG. 11), the user of the PID 210 can click on a box 902 to cause a conference call to be placed to people, numbers, or locations referred to by the flagged contact entries.

Figure 12:
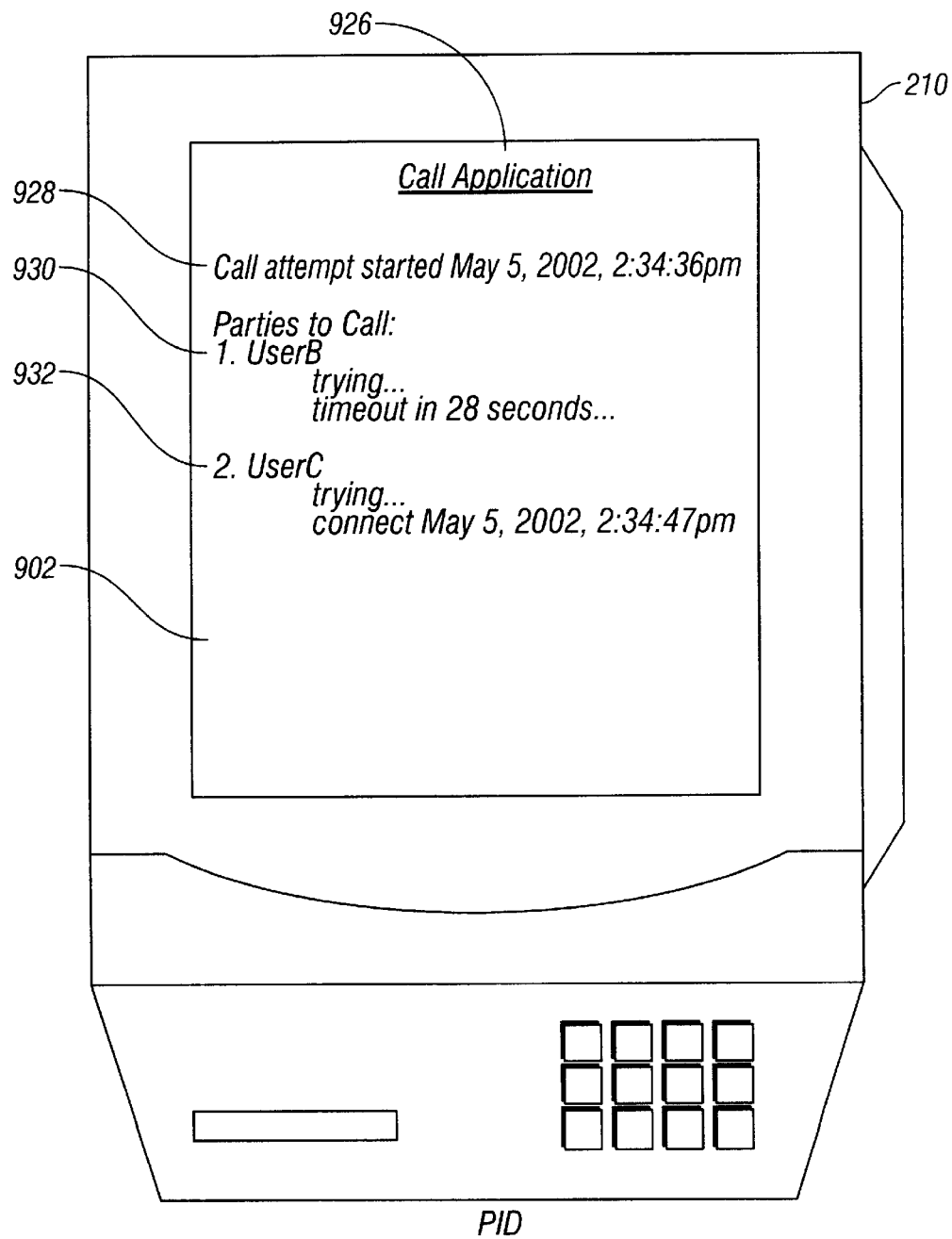
FIG. 12 is a pictorial diagram showing an exemplary display screen of a PID displaying a conference call attempt according to one embodiment of the present invention.

FIG. 12 is a pictorial diagram showing an exemplary display screen 902 of a PID 210 displaying a conference call attempt 948 according to one embodiment of the present invention. Such a screen 946 may be part of a conference call application 946 executed after contact entries are flagged in the example of FIG. 11 to initiate a conference call. The conference call application 946 is shown attempting a conference call to two communication partners: UserB 950 and UserC 952. Note that a timeout period may be set to end a call attempt to a communication partner that does not respond. Other methods for handling unanswered requests may also be implemented, and are intended to be within the scope of the present invention.

While the invention has been described in conjunction with presently preferred embodiments of the invention, persons of skill in the art will appreciate that variations may be made without departure from the scope and spirit of the invention. For example, the access networks shown in FIG. 2 may comprise any other suitable type of local area network or service infrastructure.

In addition, protocols of various types are referenced throughout. While preferred and alternative embodiments may implement selected protocols, any suitable replacement protocol not mentioned, or any function not part of a protocol used to replace a corresponding function from a protocol may be implemented without departing from the scope of the invention.

This true scope and spirit is defined by the appended claims, interpreted in light of the foregoing.

We claim:

1. A system for establishing a conference call on a data network telephony system including a network providing data connectivity for a plurality of data communications channels using data transport protocols, the system comprising in combination:

a plurality of data network telephones connected to the network, each data network telephone operable to communicate a voice signal as voice-over-data packets on a voice-over-data channel, the voice-over-data channel being one of the plurality of data communications channels on the network, the data network telephones each operable to convert voice-over-data packets communicated on the voice-over-data channel to voice signals; and a portable information device comprising a user interface and a data network telephone interface, the user interface operable to accept communication partner data from a user, the first data network telephone interface operable to communicate the communication partner data to a first data network telephone to enable the first data network telephone to invite at least one communication partner to a conference call, the at least one communication partner specified in the communication partner data.

2. The system of claim 1 wherein the user communicates voice data on the voice-over-data channel with the at least one communication partner.

3. The system of Claim 1 wherein each data network telephone includes a device identifier.

4. The system of claim 3 wherein the device identifier includes an Internet Protocol (IP) address.

5. The system of claim 3 wherein the communication partner data includes at least one Session Initiation Protocol (SIP) address.

6. The system of claim 3 wherein the communication partner data includes at least one E.164 telephone number.

7. The system of claim 1 further comprising:
at least one database accessible through the network to store a plurality of device identifiers and a plurality of user identifiers associated with the plurality of device identifiers; and
at least one network telephony connection server operable to access the at least one database to initiate the voice-over-data channel in response to the first data network telephone inviting the at least one communication partner.

8. The system of claim 1, wherein the conference call is set up in accordance with the Session Initiation Protocol (SIP).

9. The system of claim 1, wherein the conference call is set up in accordance with the H.323 Protocol.

10. The system of claim 1, wherein the conference call is set up in accordance with the MEGACO protocol.

11. The system of claim 1, wherein the conference call is set up in accordance with the MGCP protocol.

12. The system of claim 7 wherein:
the first data network telephone sends an invite message to invite the at least one communication partner, wherein the invite message includes a communication partner user identifier
the request message includes a callee user identifier; and
wherein the network telephony connection server accesses the database to determine a communication partner device identifier corresponding to the communication partner user identifier.

13. The system of claim 2 wherein the user communicates PID data on a PID data channel with the at least one communication partner, the PID data channel being one of the plurality of data communication channels on the data network.

14. The system of claim 1, further comprising a conference server linked to the network, wherein the first data network telephone invites the at least one communication partner to the conference call by inviting the conference server, and wherein the conference server invites each at least one communication partner at corresponding data network telephones.

15. A method for enabling a user to initiate a conference call with a portable information device, comprising in combination:
accepting from the user at the portable information device at least one contact entry selection corresponding to at least one communication partner, wherein each of the at least one contact entry selections includes a user identifier; and
transmitting the at least one user identifier to a data network telephone linked to a data network, wherein the data network telephone establishes the conference call by inviting the at least one communication partner to the conference call, whereby the user may use the data network telephone to communicate voice data with the at least one communication partner via the data network.

16. A computer-readable medium containing instructions for causing a processing unit to perform the method of claim 15.

17. The method of claim 15, wherein the data network telephone invites the at least one communication partner by transmitting at least one invite message to a registration server, wherein the at least one invite message includes the user identifier, wherein the registration server accesses a registration database to determine a device identifier registered to the user identifier, and wherein the device identifier corresponds to a communication partner data network telephone linked to the data network.

18. The method of claim 15, wherein the portable information device is a personal digital assistant (PDA).

19. The method of claim 15, wherein the portable information device is a wireless phone.

20. The method of claim 15, wherein the data network is a public internet.

21. The method of claim 15, wherein the conference call is established according to the Session Initiation Protocol (SIP).

22. The method of claim 15, wherein the conference call is established according to the H.323 protocol.

23. The method of claim 15, wherein the conference call is established according to the MGCP protocol.

24. The method of claim 15, wherein the conference call is established according to the MEGACO protocol.

25. The method of claim 15, wherein the user makes the at least one contact entry selection using an address book application located on the portable information device.

26. The method of claim 15, further comprising:
accepting PID data from the user at the portable information device; and
transmitting the PID data to the data network telephone, wherein the data network telephone communicates the PID data to at least one communication partner data network telephone to enable at least one of the communication partners to receive the PID data at a communication partner portable information device.

27. The method of claim 15, wherein the PID data is non-voice data that is communicated concurrently with the voice data.

28. The method of claim 16, wherein at least two communication partners are invited, and wherein the data network telephone mixes the voice data to enable each communication partner to communicate voice data with each other communication partner and the user.

29. The method of claim 15, wherein at least two communication partners are invited, wherein each of the communication partners is associated with a communication partner data network telephone, and wherein at least one of the communication partners invites another communication partner to enable each communication partner to communicate voice data with each other communication partner and the user.

30. The method of claim 15, wherein the data network telephone invites the at least one communication partner to the conference call by inviting a conference server, and wherein the conference server invites each of at least one communication partner data network telephones corresponding to each of the at least one communication partner.

31. A data network telephone for use in establishing a data network telephony conference call, comprising in combination:

a network interface linking a first data network telephone to a data network, wherein the data network includes a plurality of data network telephones with which the first data network telephone may be used to communicate voice data-in a conference call;

a PID interface for accepting PID data from a portable information device associated with a_user, wherein the PID data includes at least one user identifier corresponding to at least one communication partner, and wherein the at least one communication partner is selected by the user via an address book application on the portable information device;

a processor for constructing at least one invite message containing the at least one user identifier, wherein the invite message is used to invite the at least one communication partner to the conference call; and a user interface including an audio input and an audio output, wherein the user interface enables the user to communicate voice data with at least one communication partner associated with at least one of the plurality of data network telephones.

32. The data network telephone of claim 31, wherein the PID data additionally includes on-voice-data that may be communicated to the at least one communication partner to enable the at least one communication partner to receive the non-voice data on at least once communication partner portable information device.

33. The method of claim 31, wherein the portable information device is a personal digital assistant (PDA).

34. The method of claim 31, wherein the portable information device is a wireless phone.

35. The method of claim 31, wherein the data network is a public internet.

36. The method of claim 31, wherein the invite message is constructed according to the Session Initiation Protocol (SIP).

37. The method of claim 31, wherein the invite message is constructed according to the H.323 protocol.

38. The method of claim 31, wherein the invite message is constructed according to the MGCP protocol.

39. The method of claim 32, wherein the invite message is constructed according to the MEGACO protocol.

* * * * *